(12) United States Patent
Gupta et al.

(10) Patent No.: US 10,945,266 B2
(45) Date of Patent: *Mar. 9, 2021

(54) APPARATUS, SYSTEM AND METHOD OF MULTIBAND WIRELESS COMMUNICATION

(71) Applicant: INTEL IP CORPORATION, Santa Clara, CA (US)

(72) Inventors: Vivek Gupta, San Jose, CA (US); Necati Canpolat, Beaverton, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/710,321

(22) Filed: Dec. 11, 2019

(65) Prior Publication Data

US 2020/0112961 A1    Apr. 9, 2020

Related U.S. Application Data

(63) Continuation of application No. 16/125,712, filed on Sep. 9, 2018, now Pat. No. 10,531,463, which is a
(Continued)

(51) Int. Cl.
*H04W 88/12* (2009.01)
*H04W 72/04* (2009.01)
(Continued)

(52) U.S. Cl.
CPC ....... *H04W 72/0453* (2013.01); *H04W 24/02* (2013.01); *H04W 36/22* (2013.01);
(Continued)

(58) Field of Classification Search
CPC .... G06Q 50/01; G06Q 10/10; G06Q 30/0261; G06Q 10/02; G06Q 30/02;
(Continued)

(56) References Cited

U.S. PATENT DOCUMENTS 7,797,018 B2   9/2010  Chandra
9,386,496 B2   7/2016  Gupta et al.
(Continued)

OTHER PUBLICATIONS

Office Action for Taiwanese Patent Application Serial No. 104105397, dated Feb. 22, 2016, 7 pages (Including 1 page of English translation.).

(Continued)

*Primary Examiner* — Nimesh Patel
(74) *Attorney, Agent, or Firm* — Shichrur & Co.

(57) ABSTRACT

Some demonstrative embodiments include apparatuses, systems and/or methods of multiband wireless communication. For example, a multiband wireless communication device may include a receiver to receive a first message from a mobile device, the first message including multiband capability information indicating a plurality of supported wireless communication bands of the mobile device; a controller to select a selected wireless communication band from the plurality of supported wireless communication bands; and a transmitter to transmit a second message to the mobile device, the second message including an indication of the selected wireless communication band.

20 Claims, 7 Drawing Sheets

Related U.S. Application Data continuation of application No. 15/161,248, filed on May 22, 2016, now Pat. No. 10,098,118, which is a continuation of application No. 14/227,952, filed on Mar. 27, 2014, now Pat. No. 9,386,496.

(51) Int. Cl.
| | | |
|---|---|---|
| *H04W 36/22* | (2009.01) | |
| *H04W 72/02* | (2009.01) | |
| *H04W 76/10* | (2018.01) | |
| *H04W 48/14* | (2009.01) | |
| *H04W 24/02* | (2009.01) | |
| *H04W 36/06* | (2009.01) | |
| *H04W 28/08* | (2009.01) | |
| *H04W 84/12* | (2009.01) | |
| *H04W 88/06* | (2009.01) | |
| *H04W 48/18* | (2009.01) | |
| *H04W 92/02* | (2009.01) | |

(52) U.S. Cl.
CPC ........... *H04W 48/14* (2013.01); *H04W 72/02* (2013.01); *H04W 76/10* (2018.02); *H04W 28/08* (2013.01); *H04W 36/06* (2013.01); *H04W 48/18* (2013.01); *H04W 72/042* (2013.01); *H04W 84/12* (2013.01); *H04W 88/06* (2013.01); *H04W 88/12* (2013.01); *H04W 92/02* (2013.01)

(58) Field of Classification Search
CPC .............. G06Q 30/0601; G06Q 10/00; G06Q 30/0207; G06Q 20/0453; G06Q 20/3278; G06Q 20/40145; G06Q 30/0258; G06Q 30/0259; G06Q 30/0267; G06Q 20/4014; G06Q 20/32; G06Q 50/22; G06Q 50/265; G06Q 30/0643; G06Q 10/1097; H04L 63/0861; H04L 65/1059; H04L 2209/608; H04L 43/16; H04L 67/02; H04L 63/107; H04L 63/102; H04L 63/10; H04L 63/0892; H04L 63/08; H04L 63/12; H04L 2209/80; H04L 63/108; H04L 9/32; H04L 9/3231; H04L 41/0806; H04L 67/303; H04L 63/1416; Y02D 70/1262; Y02D 70/142; Y02D 70/144; Y02D 70/146; Y02D 70/164; Y02D 70/22; Y02D 70/1242; Y02D 70/1222; Y02D 10/24; Y02D 70/166; Y02D 70/26; Y02D 70/23; H04W 4/21; H04W 4/02; H04W 4/023; H04W 4/029; H04W 4/021; H04W 52/0254; H04W 4/027; H04W 12/06; H04W 64/00; H04W 52/0258; H04W 12/08; H04W 4/025; H04W 52/0225; H04W 52/0251; H04W 4/90; H04W 52/18; H04W 4/23; H04W 4/80; H04W 88/02; H04W 12/12; H04W 8/16; H04W 41/0806; H04W 63/08; H04W 67/303; H04W 63/10; H04W 63/1416; G06F 16/29; G06F 3/0482; G06F 2221/2111; G06F 2201/805; G06F 21/32; G06F 21/316; G06F 21/602; G06F 21/6245; G06F 16/3418; G06F 19/30; G06F 19/325; G06F 1/163; G06F 2203/011; G06F 3/005; G06F 3/013; G06F 3/017; G06F 3/04815; G06F 17/2765; G06F 21/60; G06K 9/00228; G06K 9/00677; G06K 9/00711; G06K 9/00013; G06K 9/00221; G06K 9/00335; G06K 9/00369; G06K 9/0071; G06K 19/10; G06K 2209/01; G06K 9/00302; G06K 9/00362; G06K 9/00664; G06K 9/00671; G06K 9/00892; G06K 9/00778; G06K 9/4642; G06K 9/00785; G06K 9/00771; G08B 13/196; G08B 13/19689; G08B 25/10; G08B 7/068; G08B 13/126; G08B 13/19613; G08B 13/1966; G08B 25/005; G08B 25/08; G08B 13/1963; G08B 21/10; G08B 13/00; G08B 13/1961; G08B 13/19641; G08B 13/19697; G08B 25/006; G08B 25/14; H04M 1/72536; H04M 2201/50; H04M 2242/04; H04M 1/66; H04M 2250/14; H04M 11/007; H04M 2250/52; A61B 5/0022; A61B 5/746; A61B 2503/06; A61B 5/002; A61B 5/02438; A61B 5/118; A61B 5/747; G01S 2205/00; G01S 2205/008; G01S 5/009; G01S 5/0018; G01S 5/0054; G01S 19/17; G01S 5/0231; H04N 7/181; H04N 7/188; H04N 21/21805; H04N 21/2187; H04N 21/8153; H04N 5/2259; H04N 5/23206; H04N 5/23212

See application file for complete search history.

(56) References Cited

U.S. PATENT DOCUMENTS

| | | | |
|---|---|---|---|
| 10,098,118 | B2 | 10/2018 | Gupta et al. |
| 10,531,463 | B2 | 1/2020 | Gupta et al. |
| 2006/0251020 | A1 | 11/2006 | Olvera-Hernandez et al. |
| 2006/0281488 | A1 | 12/2006 | Chang et al. |
| 2009/0036134 | A1* | 2/2009 | Ryu ............... H04W 36/14 455/437 |
| 2012/0300759 | A1 | 11/2012 | Patanapongpibul et al. |
| 2013/0010719 | A1 | 1/2013 | Shapira |
| 2013/0077482 | A1* | 3/2013 | Krishna ............. H04W 36/22 370/230 |
| 2013/0083689 | A1 | 4/2013 | Mercier et al. |
| 2013/0242783 | A1 | 9/2013 | Horn et al. |
| 2013/0272287 | A1 | 10/2013 | Xiang et al. |
| 2013/0301551 | A1 | 11/2013 | Ghosh et al. |
| 2013/0301607 | A1 | 11/2013 | McCann et al. |
| 2014/0010222 | A1 | 1/2014 | Chen et al. |
| 2014/0043966 | A1 | 2/2014 | Lee et al. |
| 2014/0280901 | A1 | 9/2014 | Balachandran et al. |
| 2015/0009966 | A1 | 1/2015 | Lee et al. |
| 2016/0105379 | A1 | 4/2016 | Murthy et al. |
| 2016/0197785 | A1 | 7/2016 | Petrick et al. |
| 2016/0335111 | A1 | 11/2016 | Bruun et al. |
| 2016/0374086 | A1 | 12/2016 | Gupta et al. |
| 2018/0376385 | A1 | 12/2018 | Killadi et al. |
| 2019/0141706 | A1 | 5/2019 | Gupta et al. |

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

IEEE Std 802.11ad™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

Wi-Fi Alliance Technical Committee P2P Task Group; Wi-Fi Peer-to-Peer (P2P) Technical Specification; Version 1.2; Dec. 14, 2011; 160 pages.

(56) References Cited

OTHER PUBLICATIONS

ETSI TS 136 300 V11.3.0 (Nov. 2012); LTE; Evolved Universal Terrestrial Radio Access (E-UTRA) and Evolved Universal Terrestrial Radio Access Network (E-UTRAN); Overall description; Stage 2 (3GPP TS 36.300 version 11.3.0 Release 11); Nov. 2012; 217 pages.
3GPP TS 23.402 V11.4.0 (Sep. 2012); 3rd Generation Partnership Project; Technical Specification Group Services and System Aspects; Architecture enhancements for non-3GPP accesses (Release 11), Sep. 2012; 252 pages.
3GPP TS 24.312 V11.4.0 (Sep. 2012); 3rd Generation Partnership Project; Technical Specification Group Core Network and Terminals; Access Network Discovery and Selection Function (ANDSF) Management Object (MO); (Release 11); Sep. 2012; 169 pages.
3GPP TS 24.302 V11.4.0 (Sep. 2012); 3rd Generation Partnership Project; Technical Specification Group Core Network and Terminals; Access to the 3GPP Evolved Packet Core (EPC) via non-3GPP access networks; Stage 3 (Release 11); Sep. 2012; 62 pages.
Wireless Gigabit Alliance (WGA) Specifications; WiGig MAC and PHY Specification Version 1.1, Apr. 2011—Final Specification; 442 pages.
Wi-Fi Alliance® Technical Committee; Hotspot 2.0 Technical Task Group; Hotspot 2.0 (Release 1); Technical Specification; Version 1.0.0, May 7, 2012, 25 pages.
International Search Report and Written Opinion for International Patent Application No. PCT/US2015/017647, dated Jun. 9, 2015, 11 pages.
Office Action for U.S. Appl. No. 14/227,952, dated Oct. 7, 2015, 12 pages.
Notice of Allowance for U.S. Appl. No. 14/227,952, dated Feb. 9, 2016, 9 pages.
Office Action for Taiwanese Patent Application Serial No. 104105397, dated Jun. 7, 2016, 2 pages.
International Preliminary Report on Patentability for PCT/US2015/017647, dated Oct. 6, 2016, 8 pages.
Office Action for U.S. Appl. No. 15/161,248, dated Aug. 11, 2017, 19 pages.
European Search Report for European Patent Application No. 15768312.9 dated Oct. 18, 2017, 10 pages.
Lancom: "WLAN Band Steering—LANCOM(TM) Techpaper", XP055364634, Retrieved from the Internet: URL:http://www.contica.pl/gfx/contica/userfiles/_public/specyfikacje_en/techpaper/tp-wlan-band-steering-en.pdf [retrieved on Apr. 13, 2017], * the whole document * Sep. 1, 2012, 4 pages.
Gabor Bajko (Nokia): "Supported Operating Band; 11-11-1064-00-00ai-supported-operating-band" IEEE SA Mentor; 11-11-1064-00-00AI-SUPPORTED-OPERATING-BAND, IEEE-SA Mentor. Piscataway, NJ USA, vol. 802.11ai, XP068037057, [retrieved on Jul. 20, 2011], Jul. 20, 2011, 5 pages.
Giwon Park (LG): "Band adjustment between 2.4GHz and 5GHz ;11-12-1042-03-00ai-band-adjustment-between-2-4ghz-and-5ghz". IEEE SA Mentor; 11-12-1042-03-00AI-BAND-ADJUSTMENT-BETWEEN-2-4GHZ-AND-5GHZ, IEEE-SA Mentor, Piscataway, NJ USA, vol. 802. 11ai, No. 3, XP068039701, [retrieved on Sep. 19, 2012], Sep. 19, 2012, 9 pages.
Office Action for U.S. Appl. No. 15/161,248, dated Feb. 26, 2018, 20 pages.
Notice of Allowance for U.S. Appl. No. 15/161,248, dated Jun. 4, 2018, 12 Pages.
Office Action for U.S. Appl. No. 16/125,712, dated Feb. 25, 2019, 30 pages.
European Search Report for European Patent Application No. 19157810.3, dated Apr. 8, 2019, 10 pages.
Juan Carlos Zuniga et al: "WLAN and Cellular Interworking and Discovery Use Case ; 11-12-0346-02-0isd-wlan-and-cellular-interworking-and-discovery-use-case", IEEE SA Mentor; vol. 802.11 ISD, No. 2, May 14, 2012 (May 14, 2012), pp. 1-12, 12 pages.
Notice of Allowance for U.S. Appl. No. 16/125,712, dated Aug. 19, 2019, 22 Pages.

\* cited by examiner

APPARATUS, SYSTEM AND METHOD OF MULTIBAND WIRELESS COMMUNICATION

TECHNICAL FIELD

Embodiments described herein generally relate to multiband wireless communication.

BACKGROUND

Multiband wireless communication devices may be configured to operate over a plurality of wireless communication bands. The wireless communication bands may include, for example, unlicensed frequency bands. For example, the wireless communication bands may include Wireless Local Area Network (WLAN) frequency bands, e.g., Wireless-Fidelity (WiFi) frequency bands, and/or cellular bands. In one example, a multiband wireless communication device may be configured to communicate over a 2.4 Gigahertz (GHz) band, a 5.0 GHz band, a 60 GHz band, a Television White Space (TVWS) band, and the like.

In some current WiFi deployments the 2.4 GHz band, which utilizes only 3 non-overlapping 20 Megahertz (MHz) channels, is saturated, while the 5 GHz band is currently unsaturated.

As more and more multiband Access Points (APs) and stations (STAs) are provided with multiband capabilities, there is a growing need for solutions to utilize the multiband capabilities to optimize the use of each of the wireless communication bands.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
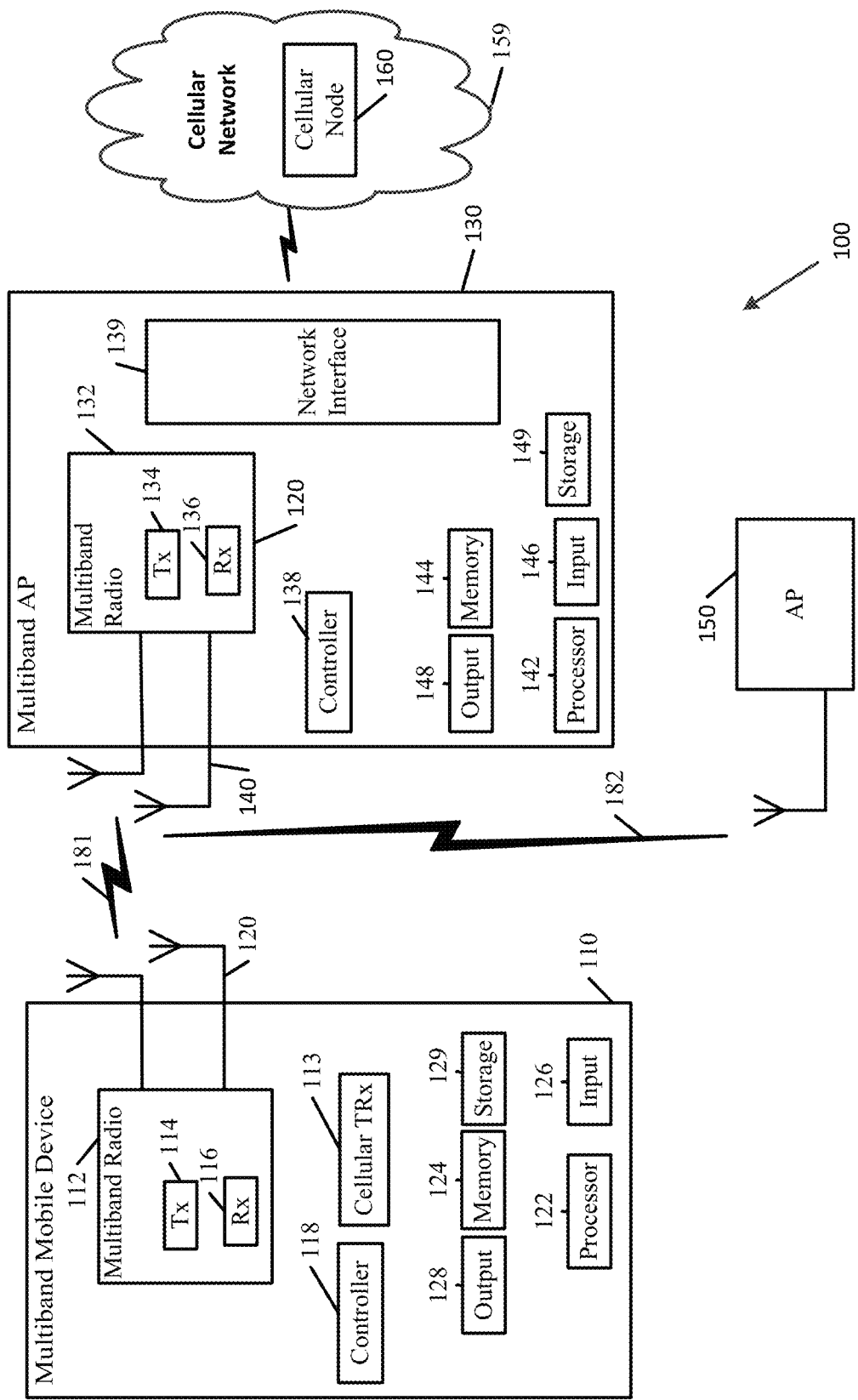
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, one way and/or two-way radio communication systems, a wireless communication station, a wireless communication device, a wireless Access Point (AP), a mobile device, a User Equipment (UE), cellular radio-telephone communication systems, a node, a base station, a server computer, a wired or wireless router, a wired or wireless modem, a wired or wireless network, a wireless area network, a cellular network, a cellular node, a cellular technology operating in unlicensed spectrum, a Wireless Local Area Network (WLAN), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, multi-standard radio devices or systems, and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing IEEE 802.11 standards (*IEEE* 802.11-2012, *IEEE Standard for Information technology—Telecommunications and information exchange between systems Local and metropolitan area* networks—Specific requirements Part 11: Wireless LAN Medium Access Control (MAC) and Physical Layer (PHY) Specifications, Mar. 29, 2012; IEEE802.11 task group ac (TGac) ("IEEE802.11-09/0308r12—TGac Channel Model Addendum Document"); IEEE 802.11 task group ad (TGad) (IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 Dec. 2012)) and/or future versions and/or derivatives thereof, devices and/or networks operating in accordance with existing and/or Wireless Fidelity (WiFi) Alliance (WFA) Peer-to-Peer (P2P) specifications (WiFi P2P technical specification, version 1.2, 2012; Hotspot 2.0 Technical Specification v1.0.0), and/or future versions and/or derivatives thereof, devices and/or networks operating in accordance with existing Long Term Evolution (LTE) specifications (including ETSI TS 136 300 V11.3.0 (2012 November): LTE; Evolved Universal Terrestrial Radio Access (E-UTRA) and Evolved Universal Terrestrial Radio Access Network (E-UTRAN); Overall description; Stage 2 (3GPP TS 36.300 version 11.3.0 Release 11), 2012; 3GPP TS 23.402: Architecture enhancements for non-3GPP accesses, Release 11, September 2012; 3GPP TS 24.312: Access Network Discovery and Selection Function (ANDSF) Management Object (MO), Release 11, September 2012; 3GPP TS 24.302: Access to the 3GPP Evolved Packet Core (EPC) via non-3GPP access networks; Stage 3), Release 11, September 2012) and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, Fifth Generation (5G) mobile networks, 3GPP, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1×RTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a radio, which is capable of communicating a wireless communication signal, may include a wireless transmitter to transmit the wireless communication signal to at least one other radio, and/or a wireless communication receiver to receive the wireless communication signal from at least one other radio. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN. Other embodiments may be used in conjunction with any other suitable wireless communication network, for example, a wireless area network, a "piconet", a WPAN, a WWAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a Wireless-Gigabit (WiGig) frequency band, e.g., according to the WGA specification, a WiFi frequency band, a Wi-Fi Direct frequency band, a frequency band according to the IEEE 802.11 standards, e.g., according to IEEE 802.11ad ("the 802.11ad frequency band"), a frequency band according to the WiFi standards, and the like.

Some demonstrative embodiments are described herein with respect to a LTE cellular network. However, other embodiments may be implemented in any other suitable cellular network, e.g., a 3G cellular network, a 4G cellular network, a 5G cellular network, a WiMax cellular network, and the like.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

The phrase "access point" (AP), as used herein, may include an entity that contains one station (STA) and provides access to distribution services, via the WM for associated STAs.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/ receive elements. The antenna may include, for example, a phased array antenna, a single element antenna, a set of switched beam antennas, and/or the like.

The phrase "mmWave frequency band" as used herein may relate to a frequency band above 20 GHz, e.g., a frequency band between 20 GHz and 300 GHz.

Some demonstrative embodiments are described herein with respect to mmWave radio resources and/or mmWave wireless communication links, however other embodiments may be used in conjunction with any other suitable radio resources and/or any other wireless communication links.

The term "cell", as used herein, may include a combination of network resources, for example, downlink and optionally uplink resources. The resources may be controlled and/or allocated, for example, by a wireless communication node (also referred to as a ""node" or a "base station"), or the like. The linking between a carrier frequency of the downlink resources and a carrier frequency of the uplink resources may be indicated in system information transmitted on the downlink resources.

Some demonstrative embodiments may be used in conjunction with a Heterogeneous Network (HetNet), which may utilize a deployment of a mix of technologies, frequencies, cell sizes and/or network architectures, e.g., including cellular, WLAN, and/or the like. In one example, the HetNet may include a radio access network having layers of different-sized cells ranging from large macro cells to small cells, for example, picocells and femtocells.

Other embodiments may be used in conjunction with any other suitable wireless communication network.

Reference is now made to FIG. 1, which schematically illustrates a block diagram of a system 100, in accordance with some demonstrative embodiments.

In some demonstrative embodiments, system 100 may include one or more wireless communication devices capable of communicating content, data, information and/or signals via a wireless medium (WM), e.g., as described below. The wireless medium may include, for example, a radio channel, a WLAN channel, Wireless Fidelity (WiFi) channel, a WiGig channel, a mmWave channel, a cellular channel, an RF channel, a an IR channel, and the like. One or more elements of system 100 may optionally be capable of communicating over any suitable wired communication links.

In some demonstrative embodiments, system 100 may include one or more multiband wireless communication devices configured to communicate over a plurality of wireless communication bands, e.g., as described below.

In some demonstrative embodiments, system 100 may include one or more multiband APs, e.g., including APs 130 and/or 150, capable of communicating with one or more multiband mobile devices, e.g., including multiband mobile device 110.

In some demonstrative embodiments, multiband mobile device 110 may include, for example, a User Equipment (UE), a mobile computer, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device, a consumer device, a vehicular device, a non-vehicular device, a portable device, a mobile phone, a cellular telephone, a PCS device, a mobile or portable GPS device, a relatively small computing device, a non-desktop computer, a "Carry Small Live Large" (CSLL) device, an Ultra Mobile Device (UMD), an Ultra Mobile PC (UMPC), a Mobile Internet Device (MID), a device that supports Dynamically Composable Computing (DCC), a Smartphone, or the like.

In some demonstrative embodiments, multiband mobile device 110, multiband AP 130, and/or multiband AP 150 may be configured to communicate, for example, over a plurality of wireless communication bands, for example, a plurality of unlicensed frequency bands, or any other wireless communication bands. For example, multiband mobile device 110, multiband AP 130, and/or multiband AP 15 may be configured to communicate over one or more Wireless Local Area Network (WLAN) frequency bands, e.g., Wireless-Fidelity (WiFi) frequency bands, and/or cellular bands. In one example, multiband mobile device 110, multiband AP 130, and/or multiband AP 150 may be configured to communicate over one or more of a 2.4 Gigahertz (GHz) band, a 5.0 GHz band, a 60 GHz band, a Television White Space (TVWS) band, and/or any other wireless communication band.

In some demonstrative embodiments, the plurality of wireless communication bands may include wireless communication bands of one or more Radio Access Technologies (RATs), for example, one or more of a WLAN technology, a cellular technology, and the like, e.g., as described below.

In some demonstrative embodiments, multiband APs 130 and 150 may form, or may be part of, an Extended Service Set (ESS), e.g., sharing a network name, security credentials, and the like. In other embodiments, APs 130 and 150 may be part of separate and/or independent Basic Service Sets (BSSs), e.g., having different network names and/or independent security credentials.

In some demonstrative embodiments, multiband AP 130 and/or multiband AP 150 may include at least one multiband radio 132 configured to communicate over a plurality of wireless communication bands ("the AP-supported bands") supported by multiband AP 130 and/or AP 150.

In some demonstrative embodiments, multiband APs 130 and 150 may share one or more AP-supported bands. For example, multiband AP 130 and multiband AP 150 may both support communication over the 2.5 GHz band and the 5 GHz band.

In some demonstrative embodiments, the AP-supported bands of multiband AP 130 may include one or more wireless communication bands, which may not be supported by multiband AP 150; and/or the AP-supported bands of multiband AP 150 may include one or more wireless communication bands, which may not be supported by multiband AP 130. For example, multiband AP 130 may support communication over the 60 GHz band, while multiband AP 150 may not support communication over the 60 GHz band; and/or multiband AP 150 may support communication over the TVWS band, while multiband AP 130 may not support communication over the TVWS band.

In some demonstrative embodiments, multiband mobile device 110 may include at least one multiband radio 112 configured to communicate over a plurality of wireless communication bands ("the mobile device supported bands") supported by mobile device 110.

In some demonstrative embodiments, the mobile device supported bands of multiband mobile device 110 may include one or more wireless communication bands, which may be supported by multiband APs 130 and/or 150. For example, multiband mobile device 110 may both support communication over the 2.5 GHz band and the 5 GHz band.

In some demonstrative embodiments, the mobile device supported bands of multiband mobile device 110 may include one or more wireless communication bands, which may not be supported by multiband AP 130 and/or multiband AP 150; and/or the mobile device supported bands of multiband mobile device 110 may not include one or more wireless communication bands, which are supported by multiband AP 130 and/or multiband AP 150. For example, multiband mobile device 110 may support communication over the 60 GHz band, and may not support communication over the TVWS band.

In some demonstrative embodiments, multiband AP 130 may communicate with multiband mobile device 110 over a WLAN link 181, e.g., a WiFi link, a P2P link, a WiGig link, and the like.

In some demonstrative embodiments, multiband AP 130 may communicate with multiband AP 150 over a WLAN link 182, e.g., a WiFi link, a P2P link, a WiGig link, and the like.

In some demonstrative embodiments, multiband radios 112 and/or 132 may include one or more wireless transmitters, receivers and/or transceivers able to send and/or receive wireless communication signals, RF signals, frames, blocks, transmission streams, frames, messages, data items, and/or data. In one example, multiband radios 112 and/or 132 may include modulation elements, demodulation elements, amplifiers, analog to digital and/or digital to analog converters, filters, and/or the like. For example, multiband radio 121 may include at least one multiband transmitter (Tx) 114 and at least one multiband receiver (Rx) 116; and/or multiband radio 132 may include at least one multiband transmitter (Tx) 134 and at least one multiband receiver (Rx) 136.

In some demonstrative embodiments, multiband mobile device 110 may include a controller 118 configured to control communications performed by multiband mobile device 110; and/or multiband AP 130 may include a controller 138 configured to control communications performed by multiband AP 130, e.g., as described below.

In some demonstrative embodiments, multiband radio 112 and controller 118 may be implemented as part of a wireless Network Interface (NI), e.g., a wireless Network Interface Card (NIC), and the like. In some demonstrative embodiments, multiband radio 132 and controller 138 may be implemented as part of a NI, e.g., a wireless NIC, and the like.

In some demonstrative embodiments, multiband radio 112 may include or may be associated with one or more antennas 120, and/or multiband radio 132 may include or may be associated with one or more antennas 140.

Antennas 120 and/or 140 may include any type of antennas suitable for transmitting and/or receiving wireless communication signals, blocks, frames, transmission streams, frames, messages and/or data. For example, antennas 120 and/or 140 may include any suitable configuration, structure and/or arrangement of one or more antenna elements, components, units, assemblies and/or arrays. Antennas 120 and/or 140 may include, for example, antennas suitable for directional communication, e.g., using beamforming techniques. For example, antennas 120 and/orb 140 may include a phased array antenna, a multiple element antenna, a set of switched beam antennas, and/or the like. In some embodiments, antennas 120 and/or 140 may implement transmit and receive functionalities using separate transmit and receive antenna elements. In some embodiments, antennas 120 and/or 140 may implement transmit and receive functionalities using common and/or integrated transmit/receive elements.

In some demonstrative embodiments, multiband mobile device 110 may also include, for example, a processor 122, an input interface 126, an output interface 128, a memory unit 124, and/or a storage unit 129; and/or multiband APs 130 and/or 150 may also include, for example, a processor 142, an input interface 146, an output interface 148, a memory unit 144, and/or a storage unit 149. Multiband mobile device 110 and/or multiband APs 130 and/or 150 may optionally include other suitable hardware components and/or software components. In some demonstrative embodiments, some or all of the components of Multiband mobile device 110, and/or multiband APs 130 and/or 150 may be enclosed in a common housing or packaging, and may be interconnected or operably associated using one or more wired or wireless links. In other embodiments, components of Multiband mobile device 110, and/or multiband APs 130 and/or 150 may be distributed among multiple or separate devices.

Processor 122 and/or processor 142 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 122 executes instructions, for example, of an Operating System (OS) of multiband mobile device 110 and/or of one or more suitable applications; and/or processor 142 executes instructions, for example, of an Operating System (OS) of multiband AP 130 and/or 150 and/or of one or more suitable applications.

Memory unit 124 and/or memory unit 144 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 129 and/or storage unit 149 may include, for example, a hard disk drive, a floppy disk drive, a Compact Disk (CD) drive, a CD-ROM drive, a DVD drive, or other suitable removable or non-removable storage units. For example, memory unit 124 and/or storage unit 129, for example, may store data processed by multiband mobile device 110, and/or memory unit 144 and/or storage unit 149, for example, may store data processed multiband APs 130 and/or 150.

Input interface 126 and/or input interface 146 may include, for example, a keyboard, a keypad, a mouse, a touch-screen, a touch-pad, a track-ball, a stylus, a microphone, or other suitable pointing device or input device. Output interface 128 and/or output interface 148 may include, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

In some demonstrative embodiments, one or more elements of system 100 may communicate with a cellular network 159.

In some demonstrative embodiments, cellular network 159 may include a Global System for Mobile (GSM) network, a Universal Mobile Telecommunications System (UMTS) network, a Long Term Evolution (LTE) network, an LTE-advanced network, a Fifth Generation (5G) network, or any other cellular network.

In some demonstrative embodiments, multiband APs 130 and/or 150 may be co-located, e.g., as part of an integrated pico-cell. Alternatively, multiband APs 130 and/or 150 may be deployed separately, e.g., as separate WiFi APs "under" a macro cellular BS, e.g., cellular node 160. In one example, WiFi networks of multiband APs 130 and/or 150 may be authenticated by an operator of cellular network 159. For example, APs 130 and/or 150 and cellular node 160 may be deployed by the same operator. In other embodiments, APs 130 and/or 150 and cellular node 160 may be deployed by different operators.

In some demonstrative embodiments, multiband mobile device 110 may be capable of communicating with a cellular node 160 of cellular network 159. For example, multiband mobile device 110 may include a cellular transceiver (TRX) 113 to communicate with cellular node 160.

In some demonstrative embodiments, cellular TRX 113 may include WCDMA and/or TD-SCDMA modulators and/or demodulators (not shown) configured to communicate downlink signals over downlink channels, e.g., between cellular node 106 and multiband mobile device 110, and uplink signals over uplink channels, e.g., between multiband mobile device 110 and cellular node 160. In other embodiments, cellular TRX 113 may include any other modulators and/or demodulators.

In some demonstrative embodiments, multiband AP 130 may be capable of communicating with cellular network 159. For example, multiband AP 130 may include a cellular interface 139 to communicate with cellular network 159.

In some demonstrative embodiments, cellular interface 139 may include a wireless interface, e.g., a cellular TRX, to communicate with cellular network 159. In other embodiments, cellular interface 139 may include a wired interface to communicate with cellular network 159.

In some demonstrative embodiments, one or more elements of system 100 may perform the functionality of a HetNet, which may utilize a deployment of a mix of technologies, frequencies, cell sizes and/or network architectures, for example, including cellular, WLAN, and/or the like.

In some demonstrative embodiments, the HetNet architecture may enable utilizing a mixture of wireless communication environments, e.g., a WLAN environment and a cellular environment, for example, to optimally respond to rapid changes in customer demand, reduce power consumption, reduce cost, increase efficiency and/or achieve any other benefit.

In some demonstrative embodiments, the HetNet may be configured to provide a service through a first wireless communication environment, e.g., a cellular network, and to maintain the service when switching to another communication environment, e.g., WLAN.

In one example, elements of system 100 may utilize a Multi-tier, Multi-Radio Access Technology (Multi-RAT) Het-Net architecture, including a tier of small cells, e.g., pico, femto, relay stations, WiFi APs, and the like, overlaid on top of a macro cellular deployment, e.g., configured to augment network capacity. For example, the small cells may be deployed within the coverage area of the macro cells.

In another example, elements of system 100 may utilize Multi-RAT small cells integrating multiple radios such as WiFi and 3GPP air interfaces in a single infrastructure device. In other embodiments, system 100 may implement any other architecture and/or deployment.

In some demonstrative embodiments, elements of system 100 may be deployed to include a network of a plurality of cells, e.g., small cells, which may be configured, for example, to deliver data to/from mobile users in order, for example, to substantially increase the throughput of the entire network.

In some demonstrative embodiments, a cell may include a wireless communication node, which may be configured to cover and/or serve a plurality of users, for example, mobile devices, e.g., User Equipment (UE), nodes of one or more other cells, e.g., other small cells, relay nodes, and the like. The wireless communication node may include or perform the functionality of a Base Station (BS), an Access Point (AP), a Node B, an LTE node, an LTE evolved node B (eNB), and the like. The deployment of the small cells may provide, for example, high-speed wireless access for communication by many users, e.g., simultaneously.

In some demonstrative embodiments, the size of a small cell may be configured, for example, such that the wireless communication node may be able to cover the small cell. In one example, the small cell may have a coverage range of about 10-100 meters, or any other range. In some demonstrative embodiments, a relatively large number of small cell base stations may be deployed to cover substantial areas such as a city or several blocks in the city. In one example, elements of system 100 may be deployed, for example, in outdoor spaces, e.g., a street, a stadium, and the like, and/or large indoor areas, e.g., conference halls, office buildings, shopping malls, and the like.

In some demonstrative embodiments, one or more elements of system 100 may be configured to enable efficient and/or improved, e.g., optimized, usage of the plurality of wireless communication bands supported by multiband mobile device 110 and/or multiband APs 130 and/or 150, e.g., as described below.

In some demonstrative embodiments, multiband mobile device 110, multiband AP 130 and/or multiband AP 150 may be configured to enable selective traffic steering between wireless communication bands and/or between networks of system 100, for example, based on one or more criteria and/or parameters, e.g., as described in detail below.

In some demonstrative embodiments, multiband mobile device 110, multiband AP 130 and/or multiband AP 150 may be configured to enable selecting a wireless communication band to communicate between multiband mobile device 110 and multiband AP 130 or multiband AP 150, for example, based on one or more criteria and/or parameters, e.g., as described in detail below.

In some demonstrative embodiments, multiband mobile device 110, multiband AP 130 and/or multiband AP 150 may be configured to select the wireless communication band to communicate between multiband mobile device 110 and multiband AP 130 or multiband AP 150, for example, based on a load balancing criterion configured to balance loads between two or more wireless communication bands, e.g., as described below.

In some demonstrative embodiments, multiband mobile device 110, multiband AP 130 and/or multiband AP 150 may be configured to select the wireless communication band to communicate between multiband mobile device 110 and multiband AP 130 or multiband AP 150, for example, based on a band performance criterion, for example, an interference management parameter, a capacity parameter, and the like, e.g., as described below.

In some demonstrative embodiments, multiband mobile device 110, multiband AP 130 and/or multiband AP 150 may be configured to select the wireless communication band to communicate between multiband mobile device 110 and multiband AP 130 or multiband AP 150, for example, based on a performance criterion corresponding to a performance of multiband mobile device 110. In one example, the performance criterion may relate to a power state and/or a battery state of multiband mobile device 110, e.g., as described below.

In some demonstrative embodiments, one or more elements of system 100 may be configured to enable band steering of multiband mobile device 110 between the wireless communication bands supported by multiband mobile device 110, load balancing between the plurality of wireless communication bands supported by APs 130 and/or 150, and/or other operational procedures with respect to the wireless communication bands supported by multiband mobile device 110 and/or multiband APs 130 and/or 150, e.g., as described below.

In some demonstrative embodiments, multiband mobile device 110, multiband AP 130 and/or multiband AP 150 may be configured to facilitate AP-centric (also referred to as "AP controlled") band steering.

The phrase "AP controlled band steering" as used herein may refer to selection, by a multiband AP, e.g., multiband AP 130, of at least one wireless communication band to be used by a multiband mobile device, e.g., multiband mobile device 110, to communicate traffic, e.g., all traffic or one or more types of traffic.

In some demonstrative embodiments, controller 138 may be configured to select for multiband mobile device 110 a wireless communication band to be used by multiband mobile device 110 to communicate with multiband AP 130.

In some demonstrative embodiments, multiband AP 130 may receive, e.g., from multiband mobile device 110, information indicating the plurality of wireless communication bands supported by multiband mobile device 110, and controller 138 may select from the plurality of wireless communication bands supported by multiband mobile device 110 a selected band to be used by multiband mobile device 110 to communicate with multiband AP 130, e.g., as described below.

In some demonstrative embodiments, controller 138 may be configured to select a band to be used by multiband mobile device 110 to communicate all traffic with multiband AP 130.

In other embodiments, controller 138 may be configured to select two or more wireless communication bands to be used by multiband mobile device 110 to communicate with multiband AP 130. For example, controller 138 may select a first band to be used by multiband mobile device 110 to communicate traffic of one or more first traffic types, and a second band to be used by multiband mobile device 110 to communicate traffic of one or more second traffic types.

In some demonstrative embodiments, multiband mobile device 110, multiband AP 130 and/or multiband AP 150 may be configured to facilitate mobile-device-centric (also referred to as "mobile device controlled") band steering.

The phrase "mobile device controlled band steering" as used herein may refer to selection, by a multiband mobile device, e.g., multiband mobile device 110, of at least one wireless communication band to be used by the multiband mobile device for communicating traffic, e.g., all traffic or one or more types of traffic.

In some demonstrative embodiments, controller 118 may be configured to select for multiband mobile device 110 a wireless communication band to be used by multiband mobile device 110 to communicate with multiband AP 130.

In some demonstrative embodiments, multiband mobile device 110 may receive, e.g., from multiband AP 130, information ("the band condition information") indicating one or more conditions of the plurality of wireless communication bands supported by multiband mobile device 110. Controller 118 may select from the plurality of wireless communication bands supported by multiband mobile device 110 a selected band to be used by multiband mobile device 110 to communicate with multiband AP 130, for example, based on the band condition information, e.g., as described below.

In some demonstrative embodiments, the selected band to be used by multiband mobile device 110 to communicate with multiband AP 130 may be selected, e.g., by controller 118, for example, to provide improved, e.g., optimized, Quality of Experience (QoE) to multiband mobile device 110, and/or based on any other selection criteria, e.g., based on a power state and/or a battery state of multiband mobile device 110.

In some demonstrative embodiments, controller 118 may be configured to select a band to be used by multiband mobile device 110 to communicate all traffic with multiband AP 130.

In other embodiments, controller 118 may be configured to select two or more wireless communication bands to be used by multiband mobile device 110 to communicate with multiband AP 130. For example, controller 118 may select a first band to be used by multiband mobile device 110 to communicate traffic of one or more first traffic types, e.g., corresponding to a particular class of applications, and a second band to be used by multiband mobile device 110 to communicate traffic of one or more second traffic types, e.g., corresponding to a different class of applications.

In some demonstrative embodiments, multiband AP 130 may be configured to steer multiband mobile device 110 to communicate with another wireless communication device, for example, another AP, e.g., multiband AP 150, or with another network, for example, cellular network 159.

In some demonstrative embodiments, multiband AP 130 may be configured to steer only some traffic streams of multiband mobile device 110. For example, multiband AP 130 may steer only some traffic streams of multiband mobile device 110, e.g., traffic of one or more first traffic types, to the other wireless communication device. According to this example, multiband mobile device 110 may communicate one or more other traffic streams, e.g., traffic of one or more second traffic types, with multiband AP 130.

In other embodiments, multiband AP 130 may be configured to steer multiband mobile device 110 to communicate all traffic with the other wireless communication device.

In other embodiments, multiband AP 130 may be configured to steer multiband mobile device 110 to communicate with the other wireless communication device, for example, based on a load of the wireless communication bands supported by multiband AP 130, e.g., as described below. Additionally or alternatively, multiband AP 130 may be configured to steer multiband mobile device 110 to communicate with the other wireless communication device, based on any other parameter, for example, an interference management criterion relating to an interference of the wireless communication bands supported by multiband AP 130, a capacity management criterion relating to a capacity of the wireless communication bands supported by multiband AP 130, and/or any other parameter or criterion.

In some demonstrative embodiments, multiband AP 130 may be configured to steer multiband mobile device 110 to communicate with the other wireless communication device, for example, based on a load of the wireless communication bands supported by the other wireless communication device, for example, the load of the wireless communication bands supported by multiband AP 150, e.g., as described below. Additionally or alternatively, multiband AP 130 may be configured to steer multiband mobile device 110 to communicate with the other wireless communication device, based on any other parameter, for example, an interference management criterion relating to an interference of the wireless communication bands supported by multiband AP 150, a capacity management criterion relating to a capacity of the wireless communication bands supported by multiband AP 150, and/or any other parameter or criterion.

In some demonstrative embodiments, multiband AP 130 may be configured to steer one or more traffic streams, or all traffic streams, of multiband mobile device 110 to the other wireless communication device, e.g., to multiband AP 150 or to cellular node 160, for example, while maintaining a session continuity during the traffic steering, e.g., as described below.

In some demonstrative embodiments, multiband AP 130 may receive information ("pre-provisioning information") corresponding to bands of cellular network 159, e.g., from cellular network 159, and/or pre-provisioning information corresponding to one or more networks of multiband AP 150, e.g., from multiband AP 150.

In some demonstrative embodiments, controller 138 may decide, for example, based on the pre-provisioning information, whether to enable multiband mobile device 110 to connect to multiband AP 130 and/or whether to steer multiband mobile device 110 to multiband AP 150 and/or to cellular network 159.

In some demonstrative embodiments, controller 138 may select the selected band to be used by multiband mobile device 110 to communicate with multiband AP 130, for example, based on the pre-provisioning information.

In some demonstrative embodiments, controller 138 may decide, for example, based on the pre-provisioning information, whether to steer multiband mobile device 110 to multiband AP 150, or to cellular network 159, e.g., as described below.

In some demonstrative embodiments, controller 138 may be configured to coordinate with multiband AP 150 one or more wireless communication bands to be used by multiband APS 130 and/or 150, and/or to coordinate load balancing of the wireless communication bands supported by APs 130 and 150.

In some demonstrative embodiments, controller 138 may be configured to coordinate with multiband AP 150 steering of multiband mobile devices between multiband APs 130 and/or 150, for example, while maintaining session continuity, e.g., as described below.

In some demonstrative embodiments, multiband mobile device 110 and multiband APs 130 and/or 150 may be configured to preserve session connectivity, e.g., Internet Protocol (IP) session connectivity, when steering traffic across bands.

In one example, one or more traffic flows of multiband mobile device 110 may be steered between a source band and a target band with the same AP, e.g., different bands supported by multiband AP 130. According to this example, the same IP address may be used across the traffic flows, and a Layer 2 (L2) connectivity may be changed across the source and traffic bands. For example, L2 communication may be resumed, e.g., once multiband mobile device 110 associates with multiband AP 130 on the target band, and multiband mobile device 110 may send to multiband AP 30 a command, e.g., a Dynamic Host Configuration Protocol (DHCP) renew command, to reclaim the IP address corresponding to the traffic flows on the target band, e.g., without requiring any disruption.

In another example, one or more traffic flows of multiband mobile device 110 may be steered between a source AP, e.g., multiband AP 130, and a target AP, e.g., multiband AP 150. According to this example, multiband mobile device 110 may associate with the target AP, and try to reclaim the same IP address, if available. If the same IP address cannot be reclaimed, multiband mobile device 110 may use suitable Mobile IP procedures to re-establish Layer 3 (L3) connectivity.

In some demonstrative embodiments, multiband AP 130 may transmit to multiband mobile device 110 band condition information corresponding to band conditions of one or more wireless communication bands supported by multiband mobile device 110. For example, multiband AP 130 may transmit the band condition information to multiband mobile device 110, in response to a request from multiband mobile device 110, e.g., as described below.

In some demonstrative embodiments, transmitter 134 may transmit a beacon including multiband capability information indicating a plurality of wireless communication bands supported by multiband AP 130, e.g., as described below.

In some demonstrative embodiments, transmitter 134 may broadcast, e.g., as part of a beacon, band condition information corresponding to band conditions of one or more wireless communication bands supported by multiband AP 130. The band condition information may, for example, enable multiband mobile device 110 to select a wireless communication band to communicate with multiband AP 130, e.g., as described below.

In some demonstrative embodiments, transmitter 114 may transmit to AP 114 a first message including multiband capability information indicating a plurality of supported wireless communication bands of multiband mobile device 110, e.g., as described below.

In some demonstrative embodiments, receiver 136 may receive the first message from multiband mobile device 110.

In some demonstrative embodiments, controller 138 may select a selected wireless communication band from the plurality of wireless communication bands supported by multiband mobile device 110, and transmitter 134 may transmit to multiband mobile device 110 a second message including an indication of the selected wireless communication band.

In some demonstrative embodiments, controller 138 may select the selected wireless communication band, for example, based on a load of the selected wireless communication band. For example, controller 138 may select a selected wireless communication band to include a band having the least load, e.g., compared to the load of other wireless communication bands supported by multiband mobile device 110.

In other embodiments, controller 138 may select the selected wireless communication band, for example, based on any other additional or alternative criterion and/or parameter, for example, based on a Quality of Service (Qos) criterion, a QoE criterion, an interference management criterion relating to an interference level of the selected wireless communication band, a type of traffic to be communicated over the selected wireless communication band, a capacity of the selected wireless communication band, and the like.

In some demonstrative embodiments, receiver 116 may receive the second message from multiband AP b 130.

In some demonstrative embodiments, controller 118 may control transmitter 114 and receiver 116 to communicate with multiband AP 130 over the selected wireless communication band, e.g., as described below.

In some demonstrative embodiments, multiband mobile device 110 may transmit the first message as a pre-association query message, e.g., prior to association with multiband AP 130, for example, to query multiband AP 130 for a preferred wireless communication band to be used for communicating between multiband mobile device 110 and multiband AP 130. According to these embodiments, multiband AP 130 may transmit the second message in response to the pre-association query message, e.g., as described below.

In some demonstrative embodiments, multiband AP 130 may transmit the second message in the form of an offloading message to offload multiband mobile device 110 to another wireless communication device ("the offloading device"), e.g., to multiband AP 150, as described below. In one example, controller 138 may select the offloading device when a load of each of the plurality of supported wireless communication bands of AP 130 is above a predefined overload threshold, e.g., as described below. Controller 138 may select the offloading device based on any other additional or alternative parameter and/roc criterion.

In some demonstrative embodiments, multiband AP 130 may receive the pre-provisioning information from the offloading device, e.g., from multiband AP 150, offloading assistance information, and controller 138 may select the selected wireless communication band to be used for communication between multiband mobile device 110 and the offloading device, for example, based on the pre-provisioning information, e.g., as described below.

In some demonstrative embodiments, multiband AP 130 may transmit the second message in the form of a steering message to steer multiband mobile device 110 from communicating one or more types of traffic, e.g., all traffic or only some of the traffic, from another wireless communication band to the selected wireless communication band.

For example, Receiver 116 may receive the steering message, and controller 118 may steer multiband mobile device 110 to the selected wireless communication band, e.g., as described below.

In some demonstrative embodiments, controller 138 may decide to steer multiband mobile device 110 between first and second wireless communication bands, for example, based on band conditions of the first and second wireless communication bands, e.g., as described below.

In some demonstrative embodiments, controller 138 may utilize the second message to perform pre-association band steering for load balancing, e.g., as described below. In other embodiments, controller 138 may utilize the second message to perform pre-association band steering based on an interference management criterion, a QoS criterion, and/or any other criterion and/or parameter.

In some demonstrative embodiments, controller 138 may be configured to select to steer one or more traffic streams of multiband mobile device 110 to another wireless communication device, e.g., to multiband AP 150 or to cellular node 160, based on one or more network management parameters. For example, transmitter 134 may transmit to multiband mobile device 110 a steering message to steer one or more traffic streams of multiband mobile device 110 to the other wireless communication device, e.g., as described below.

In some demonstrative embodiments, controller 138 may be configured to select to steer one or more traffic streams of multiband mobile device 110 to the other wireless communication device, prior to multiband AP 130 associating with multiband mobile device 110.

For example, transmitter 114 may transmit a request to associate from multiband mobile device 110 to multiband AP 130. Receiver 136 may receive the request to associate from multiband mobile device 110, and controller 138 may select to steer multiband mobile device 110 to the other wireless communication device, for example, if the request to associate is to be rejected by multiband AP 130, e.g., as described below.

In some demonstrative embodiments, transmitter 134 may transmit the second message including a neighbor Access-Point (AP) Information Element (IE), which may include the indication of the selected wireless communication band.

In some demonstrative embodiments, the first message and/or the second message may include an Access Network Query Protocol (ANQP) message, e.g., as described below.

Following is a description of some multiband management implementations, which may be utilized with respect to some deployments of system 100, in accordance with some demonstrative embodiments. In other embodiments, elements of system 100 may be configured to perform any other band selection, traffic steering and/or offloading operations.

In some demonstrative embodiments, a Hotspot service provider may deploy a wide scale Wi-Fi network including a plurality of multi-band APs, e.g., including multiband APs 130 and 150, operating on multiple bands, e.g., including the 2.4 GHz band and the 5 GHz band. The service provider may configure multiband APs 130 and 150 to control selection of the band, or channels on a specific band, which may be used by individual multiband mobile devices, e.g., multiband mobile device 110, for initial association with the multiband APs.

In some demonstrative embodiments, the service provider may configure multiband APs 130 and 150 to control the band to be used for association with multiband mobile device 110, for example, based on locally observed loading on each supported band or channel. The observed band loading may be measured, for example, in terms of interference from own neighbor APs of the service provider, APs of other surrounding networks, and/or or other devices operating in the band in proximity. The band loading may be determined based on any other additional or alternative information and/or criterion.

In some demonstrative embodiments, multiband mobile device 110 may detect multiband AP 130, and may query multiband AP 130 for a suggested band to associate with multiband AP 130, e.g., without multiband mobile device 110 having to scan all supported bands. For example, transmitter 114 may transmit to multiband AP 130 a query message to query for the preferred band, e.g., as described above. Transmitter 114 may transmit the query message on a wireless communication band chosen by multiband mobile device 110. The query message may include the indication of the wireless communication bands supported by multiband mobile device 110, e.g., as described above.

In some demonstrative embodiments, controller 138 may be aware of current loading conditions on the wireless communication bands supported by multiband AP 130. Controller 138 may also be configured with a load balancing strategy, e.g., as defined by the service provider.

In some demonstrative embodiments, controller 138 may select from the plurality of wireless communication bands supported by multiband mobile device 110 a selected band based on eh load balancing strategy, e.g., a band, which is supported by multiband AP 130, and which may be least loaded. Multiband AP 130 may transmit to multiband mobile device 110 a response indicating the selected band, e.g., as described above. Multiband mobile device 110 may be connected to a current band, which may be different from the selected band. Controller 118 may take the selected band into account, and may control multiband mobile device 110 to connect to multiband AP 130 on the selected band. A mobile device may not be capable of multiband communication. Such mobile device may ignore the indication of the selected band from multiband AP 130, and may connect to multiband AP 130 using a band supported by the mobile device.

In some demonstrative embodiments, multiband AP 130 may also utilize the load balancing strategy to elect to move an already associated multiband mobile device to another band, e.g., to balance the load between the bands supported by multiband AP 130.

In some demonstrative embodiments, multiband mobile device 110 may perform a scanning procedure to discover an AP and/or network. Controller 138 may have visibility of the load on multiband AP 130, e.g., per band supported by multiband AP 130. Controller 138 may determine a least loaded band supported by multiband AP 130.

In some demonstrative embodiments, controller 138 may determine that an operating band of multiband AP 130 may be too congested, e.g., to accommodate at least some of the traffic of multiband mobile device 110. According to these embodiments, controller 138 may control transmitter 134 to transmit to multiband mobile device 110 a message requesting multiband mobile device to connect to multiband AP 130 over another selected wireless communication band. In one example, transmitter 134 may transmit a Neighbor AP Information Element (IE) including an indication of the selected band. Multiband mobile device 110 may be connected to a current band, which may be different from the selected band. Controller 118 may take the selected band into account, and may control multiband mobile device 110 to connect to multiband AP 130 on the selected band.

In some demonstrative embodiments, multiband mobile device 110 may attempt to associate to multiband AP 130, when all bands supported by multiband AP 130 may be congested, e.g., having a congestion level greater than a predefined congestion threshold. According to these embodiments, controller 138 may select to reject an association request from multiband mobile device 110.

In some demonstrative embodiments, transmitter 114 may transmit to multiband mobile device 110 a response to the association request including an indication of another neighbor multiband AP, e.g., multiband AP 150, which may be less loaded.

In some demonstrative embodiments, transmitter 114 may transmit to multiband mobile device 110 a response to the association request including an indication of a wireless communication band to be used for associating with the other multiband AP.

In some demonstrative embodiments, controller 138 may offload multiband mobile device 110 to the same band or to a different band on a neighboring BSS at association, by performing a hybrid operation including both a band steering operation and a load balancing operation. In one example, transmitter 134 may transmit to multiband mobile device 110 a BSS Transition request to redirect mobile device to AP 150, e.g., post association.

Figure 2:
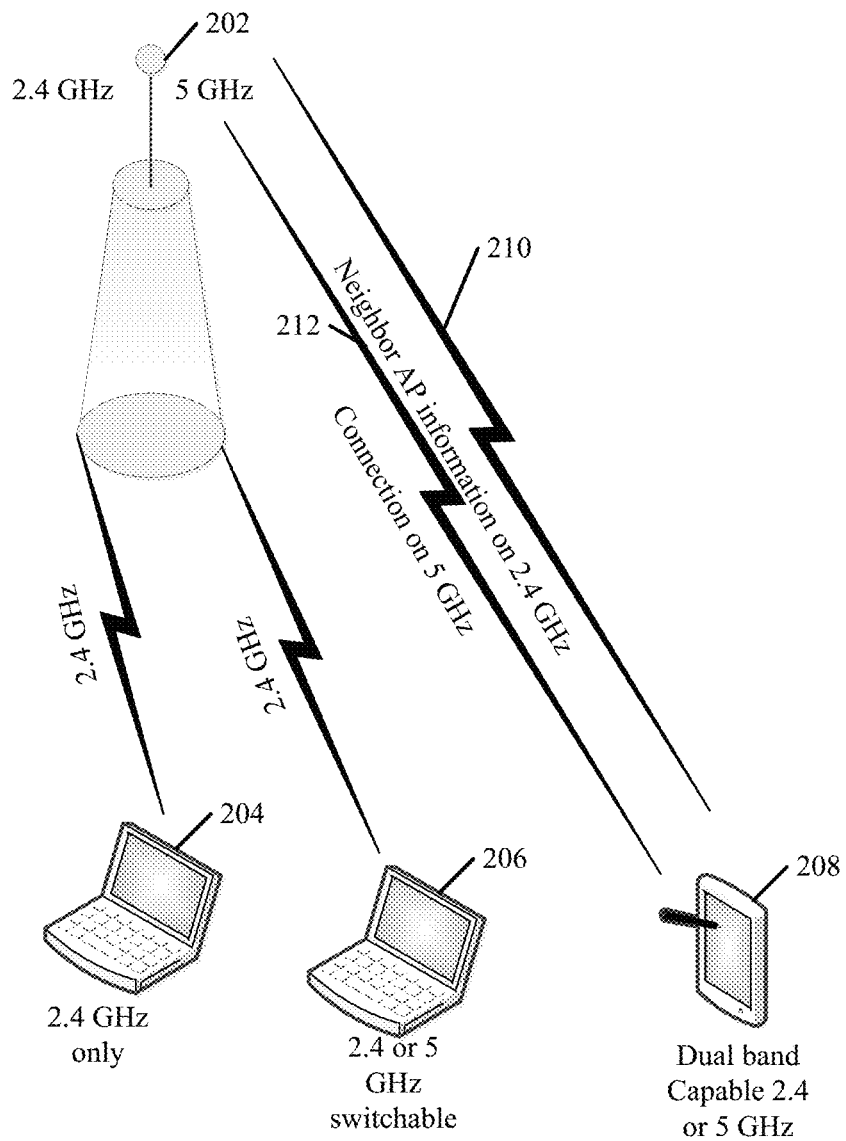
FIG. 2 is a schematic block diagram illustration of a deployment of a system, in accordance with some demonstrative embodiments.

Reference is made to FIG. 2, which schematically illustrates a deployment of a system 200, in accordance with some demonstrative embodiments.

As shown in FIG. 2, system 200 may include a dual-band AP 202 supporting communication over the 2.4 GHz band and the 5 GHz band. For example, AP 202 may perform the functionality of multiband AP 130 (FIG. 1).

As shown in FIG. 2, AP 202 may communicate over the 2.4 GHz band with a laptop 204 and a laptop 206. For example, laptop 204 may support communication only over the 2.4 GHz band, while laptop 206 may support communication over both the 2.4 GHz band and over the 5 GHz band.

As shown in FIG. 2, a dual-band tablet computer 208 may support communication over both the 2.4 GHz band and the 5 GHz band. For example, dual-band tablet computer 208 may perform the functionality of multiband mobile device 110 (FIG. 1).

In some demonstrative embodiments, dual-band tablet computer 208 may scan and detect AP 202 over the 2.4 GHz band. Dual-band tablet computer 208 may request to associate with AP 202 over the 2.4 GHz band.

In some demonstrative embodiments, AP 202 may select to reject the request to associate from tablet computer 208, for example, if the 2.4 GHz band is congested, e.g., by traffic being communicated with laptops 204 and 206.

In some demonstrative embodiments, AP 202 may send to dual-band laptop computer 208 a message 210 over the 2.4 Ghz band. Message 210 may include an indication that tablet computer 208 is to connect with AP 202 over the 5 GHz band, e.g., if the 5 GHz band is not congested. For example, message 210 may include a Neighbor AP IE.

As shown in FIG. 2, tablet computer 208 may receive message 210 and establish a connection 212 with AP 202 over the 5 GHz band.

Referring back to FIG. 1, in some demonstrative embodiments, controller 118 may be configured to perform pre-association band steering at multiband mobile device 110, for example, based on one or more criteria relating to a performance of multiband mobile device 110, for example, a battery state of multiband mobile device 110, e.g., as described below.

In other embodiments, controller 118 may be configured to perform pre-association band steering at multiband mobile device 110 based on any additional or alternative criteria, for example, based on band conditions, e.g., load, interference, and the like, of the plurality of wireless communication bands supported by multiband mobile device 110; based on one or more application-related criteria corresponding to one or more applications being executed by multiband mobile device 110, e.g., one or more QoE requirements, one or more QoS requirements, and the like.

In some demonstrative embodiments, multiband APs 130 and/or 150 may be configured to transmit information ("the band selection assistance information") to assist multiband mobile device 10 in selecting the wireless communication band to be used for associating with multiband APs 130 and/or 150, e.g., without multiband mobile device 110 having to scan all channels in all bands supported by multiband mobile device 110. Enabling controller 118 to selecting the wireless communication band to be used for associating with multiband APs 130 and/or 150, without multiband mobile device 110 having to scan all channels in all bands supported by multiband mobile device 110, may enable reducing a power consumption of multiband mobile device 110.

In some demonstrative embodiments, the band selection assistance information may include, for example, current operating channels on or more, e.g., all, the bands supported by multiband mobile device 110, loading conditions on the bands and/or channels, a capacity of the bands and/or channels, interference conditions on the bands and/or channels, and the like.

In some demonstrative embodiments, multiband mobile device 110 may detect a multiband AP, e.g., multiband AP 130, and may select a band to query detected multiband AP for band selection assistance information.

In some demonstrative embodiments, transmitter 114 may transmit to multiband AP 130 a request for the band selection assistance information. Receiver 136 may receive the request for the band selection assistance information, and transmitter 134 may transmit a response including the band selection assistance information.

In some demonstrative embodiments, multiband mobile device 110 and multiband AP 130 may exchange the request and response for the band selection assistance information using one or more ANQP messages, e.g., as described below.

In some demonstrative embodiments, transmitter 134 may broadcast band selection assistance information relating to the wireless communication bands supported by multiband AP 130. For example, transmitter 134 may broadcast the band selection assistance information as part of a beacon. Receiver 116 may receive the band selection assistance information broadcasted by multiband AP 130.

In some demonstrative embodiments, controller 118 may use the band selection assistance information to select a band to connect to multiband AP 130, e.g., without needing to scan all bands supported by multiband mobile device 110.

In some demonstrative embodiments, controller 118 may autonomously determine a preferred band to connect to multiband AP 130, for example, based on the band selection assistance information and/or considering local conditions of multiband mobile device 110, e.g., a battery level of mobile device 110, a power state of multiband mobile device 110, the performance-related parameters of multiband mobile device 110, and the like.

In some demonstrative embodiments, the band selection assistance information may include an indication of a preferred band, which may be determined by controller 138, and controller 118 may consider using the preferred band, e.g., unless local conditions prevent the selection of the preferred band.

In some demonstrative embodiments, controller 138 may be configured to perform pre-association band steering at multiband AP 130, for example, to steer traffic of multiband mobile device 110 between different RATs, for example, between a WLAN of multiband AP 130 and cellular network 159, e.g., as described below.

In some demonstrative embodiments, controller 138 may steer the traffic of multiband mobile device 110 between multiband AP 130 and cellular network 159, for example, based on a throughput criterion, e.g., as described below. In other embodiments, controller 138 may steer the traffic of multiband mobile device 110 between multiband AP 130 and cellular network 159 based on any additional or alternative criterion.

Figure 3:
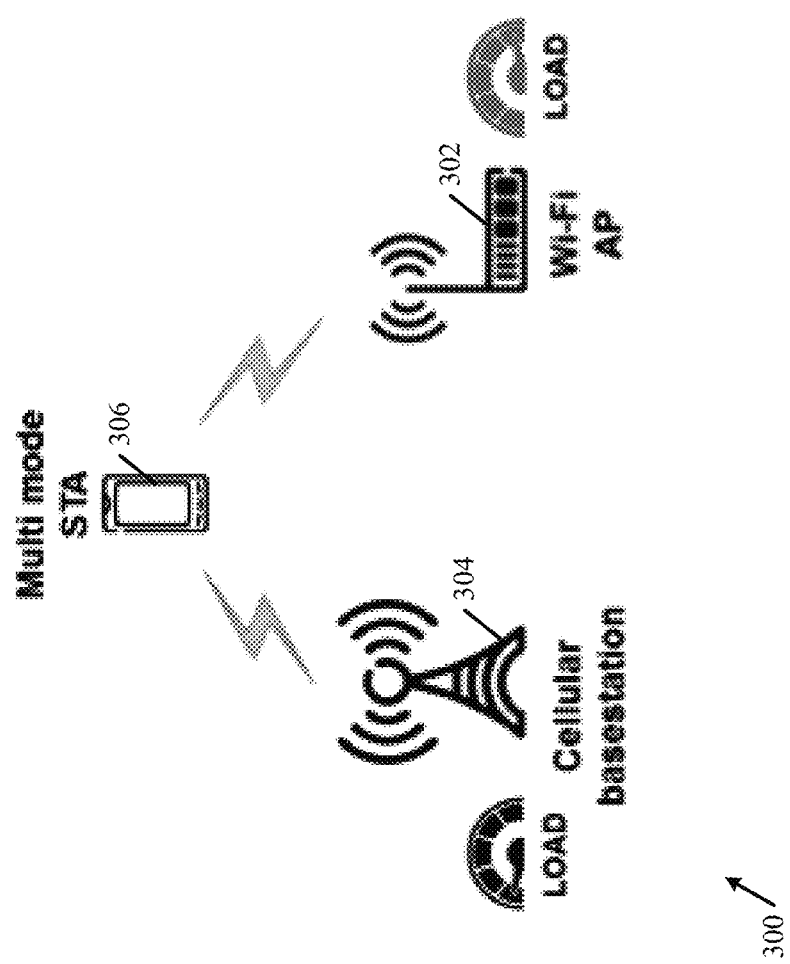
FIG. 3 is a schematic block diagram illustration of a deployment of a system, in accordance with some demonstrative embodiments.

Reference is made to FIG. 3, which schematically illustrates a deployment of a system 300, in accordance with some demonstrative embodiments.

As shown in FIG. 3, system 300 may include an AP 302 and a cellular node 304. For example, AP 202 may perform the functionality of multiband AP 130 (FIG. 1), and/or cellular node 304 may perform the functionality of cellular node 160 (FIG. 1).

As shown in FIG. 3, a multi-mode station (STA) 306 may have both Wi-Fi connectivity and cellular connectivity. For example, multi-mode STA 306 may perform the functionality of multiband mobile device 110 (FIG. 1).

In some demonstrative embodiments, multi-mode STA 306 may attempt to associate with AP 302. AP 302 may have knowledge of current conditions of the plurality of bands supported by AP b 302, for example, current load conditions, current interference conditions, Uplink-Downlink (U/L) signal strength, a network connection status, and the like, e.g., as described above.

In some demonstrative embodiments, AP 302 may select not to accept the request from multi-mode STA 306 to associate with AP 302, for example, based on one or more of the current conditions and/or one or more predefined management criteria, e.g., a load threshold.

In some demonstrative embodiments, AP 302 may explicitly steer multi-mode STA 306 to a cellular node 304. Steering multi-mode STA 306 to cellular node 304 may enable managing the load of AP 302, for example, while maintaining and/or improving a user experience of the user of multi-mode STA 306.

In some demonstrative embodiments, AP 302 may be configured to perform post-association band steering, for example, to steer traffic of multi-mode STA 306 between AP 302 and cellular node 304, e.g., as described below.

In some demonstrative embodiments, AP 302 may steer the traffic of multi-mode STA 306 between AP 302 and cellular node 304, for example, based on an interference criterion, e.g., as described below. In other embodiments, AP 302 may steer the traffic of multi-mode STA 306 between AP 302 and cellular node 304 based on any additional or alternative criterion.

In some demonstrative embodiments, multi-mode STA 306 may be associated with AP 302. AP 302 may have knowledge of current conditions of the plurality of bands supported by AP 302, for example, current load conditions, current interference conditions, Uplink-Downlink (U/L) signal strength, a network connection status, and the like, e.g., as described above.

In some demonstrative embodiments, at a certain point in time, one or more of the current conditions may reach an unacceptable level, for example, an interference level may reach a predefined interference threshold.

In some demonstrative embodiments, AP 302, e.g., controller 138 (FIG. 1) may explicitly steer multi-mode STA 306 to cellular node 304. Steering multi-mode STA 306 to cellular node 304 may enable managing the load of AP 302, for example, while maintaining and/or improving a user experience of the user of multi-mode STA 306.

In some demonstrative embodiments, AP 302 may become overloaded, for example, due to additional STAs associating with AP 302. According to these embodiments, AP 302, e.g., controller 138 (FIG. 1) may direct one or more STAs, e.g., including STA 306, which are already associated with AP 302, to a neighbor AP, e.g., to AP 150 (FIG. 1). In one example, AP 302 may send to multi-mode STA 306 an autonomous BSS Transition request including a Target BSSID of neighboring BSS managed by the neighbor AP.

Figure 4:
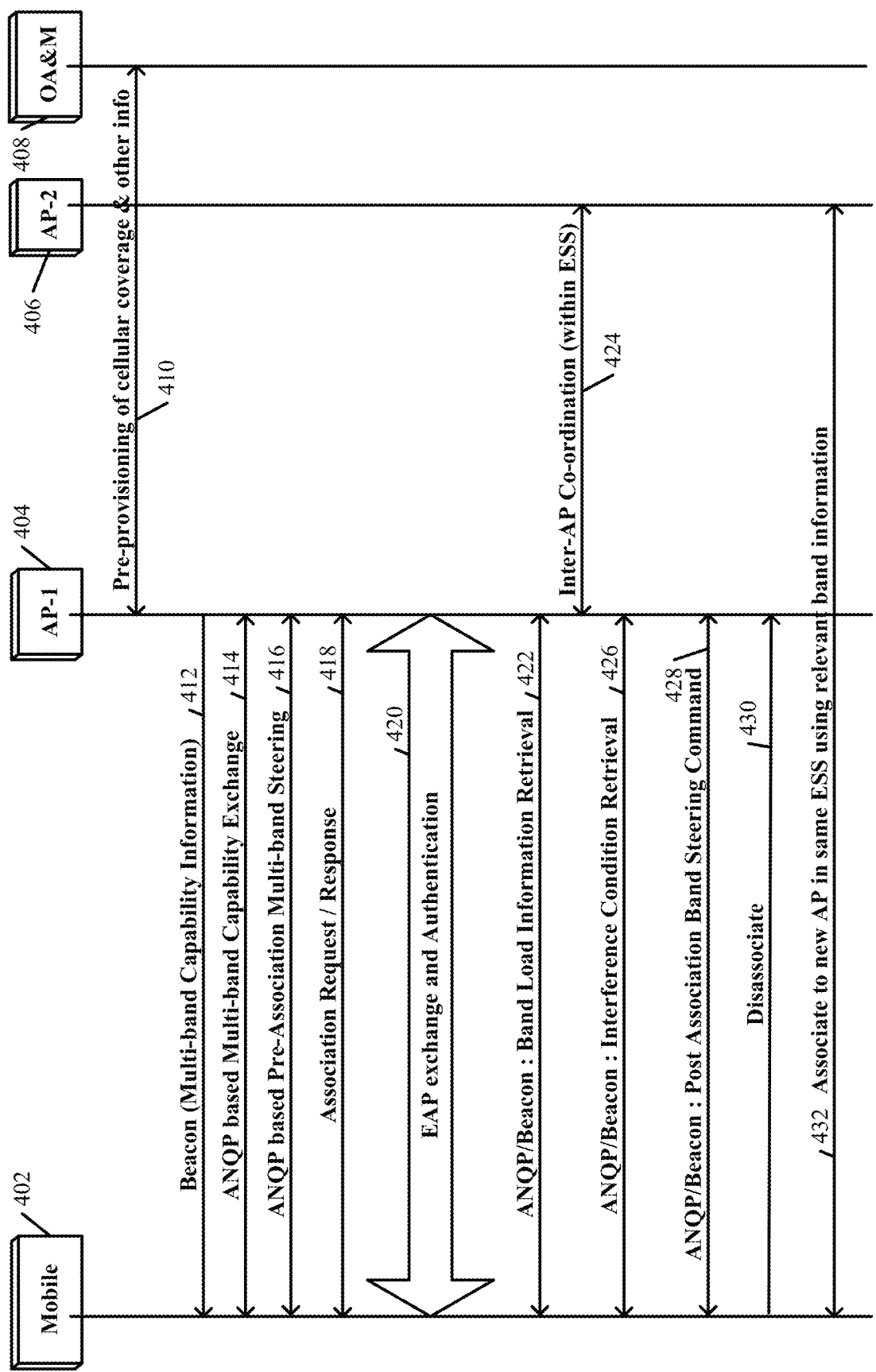
FIG. 4 is a schematic sequence diagram of operations and interactions between a mobile device, a first Access Point (AP), a second AP, and a cellular module, in accordance with some demonstrative embodiments.

Reference is made to FIG. 4, which schematically illustrates a sequence of operations and interactions between a mobile device 402, a first AP 404, a second AP 406, and a cellular module 408, in accordance with some demonstrative embodiments. For example, mobile device may perform the functionality of multiband mobile device 110 (FIG. 1), AP 404 may perform the functionality of multiband AP 130 (FIG. 1), AP 406 may perform the functionality of multiband AP 150 (FIG. 1), and/or cellular module 408 may perform the functionality of a cellular module of cellular network 159 (FIG. 1).

In some demonstrative embodiments, cellular module 408 may include an operating, administrative and maintenance (OA&M) module. For example cellular module 408 may be implemented as part of cellular node 160 (FIG. 1) or as part of any other element of cellular network 159 (FIG. 1).

As shown in FIG. 4, AP 404 may be pre-provisioned with information 410 about overlapping cellular coverage, e.g., cellular module 408.

As shown in FIG. 4, AP 404 may advertise multi-band capabilities of AP 404 via one or more beacons 412, e.g., as described above.

As shown in FIG. 4, AP 404 may exchange with mobile device 402 one or more ANQP messages 414 including multiband capability information corresponding to AP 404 and/or mobile device 402, e.g., as described above. The multiband capability information may include, for example, information of bands supported by AP 404 and/or mobile device 402, and/or whether or information relating to support of traffic steering capabilities of AP 404 and/or mobile device 402. Additional information that may be included, for example, in Associate Response, Disassociate message reason codes, and the like.

As shown in FIG. 4, AP 404 may exchange with mobile device 402 one or more ANQP messages 416 as part of a pre-association steering, for example, to select a band to communicate between mobile device 402 and AP 404, e.g., as described above.

As shown in FIG. 4, AP 404 may exchange with mobile device 402 one or more associate request and/or response messages 418, for example, to associate between mobile device 402 and AP 404 over the selected band, e.g., as described above.

As shown in FIG. 4, AP 404 may perform with mobile device 402 one or more post-association operations 420, e.g., an authentication operation.

As shown in FIG. 4, AP 404 may exchange with mobile device 402 one or more messages and/or measurement reports including load information 422 and/or interference measurements 426. For example, message 422 may include BSS Load information, backhaul load information, a load on each of the supported bands, and the like. Message 426 may include, for example, interference conditions, e.g., based on Signal to Noise Ratio (SNR) measurements, and the like.

In one example, messages 422 and/or 426 may include dedicated ANQP messages, for example, based on a Generic Advertisement Service (GAS) protocol, e.g., as described below. Alternatively, messages 422 and/or 426 may be included as part of any other messages, e.g., piggybacked on back of an Associate Response, a Disassociate message, or the like.

As shown in FIG. 4, AP 404 may exchange with AP 406 one or more inter-AP coordination messages 424, for example, to determine relative load levels and/or radio conditions, which may be used by AP 404 to decide whether to steer mobile device 402 to AP 406, e.g., as described above.

As shown in FIG. 4, AP 404 may exchange with mobile device 402 one or more post-association band-steering commands 428, for example, to steer mobile device 402 from a first band to a second band, e.g., as described above.

In one example, post-association band-steering commands 428 may be communicated via dedicated ANQP messages, e.g., as described below. Alternatively, post-association band-steering commands 428 may be included as part of any other messages, e.g., piggybacked on back of an Associate Response, a Disassociate message, or the like, or as part of dedicated WLAN messages.

As shown in FIG. 4, mobile device 402 may disassociate (430) from AP 404, e.g., based on load information 422, interference information 426, and/or steering commands 428.

As shown in FIG. 4, mobile device 402 may associate (432) with AP 406, e.g., based on load information 422, interference information 426, and/or steering commands 428.

Referring back to FIG. 1, in some demonstrative embodiments multiband AP 130 and multiband mobile device 110 may communicate one or more ANQP messages including multiband information and/or band steering commands, e.g., as described below.

In some demonstrative embodiments, multiband AP 130 and multiband mobile device 110 may communicate one or more ANQP elements, for example, ANQP vendor-specific elements, e.g., as described below.

In some demonstrative embodiments, an ANQP element may include a field ("the Subtype field"), which may identify a type of the ANQP element, which may be configured to include a Subtype value representing a Multiband information element or a band steering Command element, e.g., according to the following Table:

TABLE 1

| Element Name | Subtype Value | Extensible |
|---|---|---|
| Reserved | 0 | |
| HS Query list | 1 | |
| HS Capability list | 2 | |
| Operator Friendly Name | 3 | |
| WAN Metrics | 4 | Yes |
| Connection Capability | 5 | |
| NAI Home Realm Query | 6 | |
| Operating Class Indication | 7 | |
| OSU Providers list | 8 | Yes |
| Reserved | 9 | |
| Icon Request | 10 | |
| Icon Binary File | 11 | |
| Multi Band Information | 12 | |
| Band Steering Command | 13 | |
| Reserved | 14-255 | |

In one example, multiband AP 130 and/or multiband mobile device 110 may communicate a Multiband information ANQP element having the Subtype field value set to 12. In another example, multiband AP 130 and/or multiband mobile device 110 may communicate a Band Steering Command ANQP element having the Subtype field value set to 13.

In some demonstrative embodiments, multiband AP 130 may transmit a capability message to indicate a capability of multiband AP 130 to support multi-band information and/or to support band steering operations; and/or multiband mobile device 110 may transmit a capability message to indicate a capability of multiband mobile device 110 to support multi-band information and/or to support band steering operations.

In some demonstrative embodiments, the capability message may include a capability list ANQP message, e.g., a Hot Spot (HS) Capability list ANQP message.

In some demonstrative embodiments, a multiband device, e.g., multiband AP 130 or multiband mobile device 110, may transmit a capability message, e.g., an HS Capability ANQP message, including a subtype filed having a value to indicate the a capability of the multiband device to support multi-band information, e.g., the value 12 according to Table 1.

In some demonstrative embodiments, a multiband device, e.g., multiband AP 130 or multiband mobile device 110, may transmit a capability message, e.g., an HS Capability ANQP message, including a subtype filed having a value to indicate the a capability of the multiband device to support band steering operations, e.g., the value 13 according to Table 1.

In some demonstrative embodiments, multiband AP 130 may transmit a Multi-Band Information ANQP message including a list of bands supported by multiband AP 130. For example, transmitter 134 may transmit the Multi-Band Information ANQP message to multiband mobile device 110, e.g., in response to a GAS Query Request from multiband mobile device 110.

In some demonstrative embodiments, multiband mobile device 110 may transmit a Multi-Band Information ANQP message including a list of bands supported by multiband mobile device 110. For example, transmitter 114 may transmit the Multi-Band Information ANQP message to multi-band AP 130, for example, as part of a pre-association query, e.g., as described above.

In one example, multiband mobile device 110 may assume that multiband AP 130 supports HS ANQP-elements, e.g., upon discovering multiband AP 130 includes a HS AP, e.g., a HS 2.0 AP.

Figure 5:
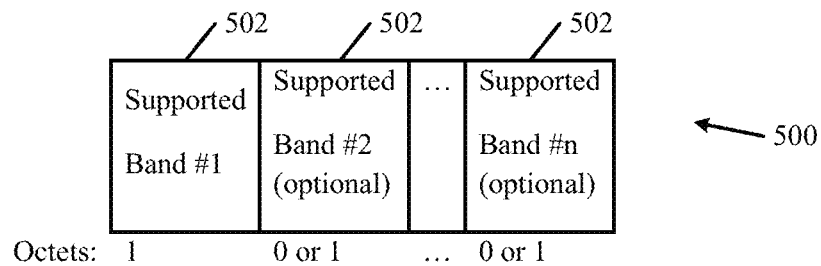
FIG. 5 is a schematic illustration of a multiband information Access Network Query Protocol (ANQP) message, in accordance with some demonstrative embodiments.

Reference is made to FIG. 5, which schematically illustrates a Multiband Information ANQP message 500, in accordance with some demonstrative embodiments.

As shown in FIG. 5, Multiband Information ANQP message 500 may include one or more values ("Supported band") 502 indicating one or more respective bands supported by a multiband device transmitting Multiband Information ANQP message 500.

In one example, Multiband Information ANQP message 500 may be transmitted by transmitter 134 (FIG. 1) to indicate one or more bands supported by multiband AP 130 (FIG. 1).

In another example, Multiband Information ANQP message 500 may be transmitted by transmitter 114 (FIG. 1) to indicate one or more bands supported by multiband mobile device 110 (FIG. 1).

In some demonstrative embodiments, a predefined specific Supported band value 502 may be assigned to indicate each of the wireless communication bands. In one example, Multiband Information ANQP message 500 may include the Supported band values ordered by increasing frequency value.

In one example, the following values may be assigned to indicate the following frequency bands:

TABLE 2

| Bands | Supported Band Value |
|---|---|
| 1900 MHz (Cellular bands) | 1 |
| 2.4 GHz | 2 |
| 5.0 GHz | 3 |
| 5150-5350 MHz | 4 |
| 5370-5470 MHz | 5 |
| 5470-5650 MHz | 6 |
| 5725-5825 MHz | 7 |
| 5825-5925 MHz | 8 |
| 60 GHz | 9 |
| TV White Space bands | 10 |

In other embodiments, any other values may be assigned to the frequency bands of Table 1 and/or to any other one or more additional or alternative frequency bands.

Referring back to FIG. 1, in some demonstrative embodiments multiband mobile device 110 and/or multiband AP may be configured to transmit a Band Steering Command ANQP message, e.g., as described below.

In one example, transmitter 134 may transmit the Band Steering Command ANQP message to multiband mobile device 110, e.g., to request multiband mobile device 110 to steer communications from one band to another.

In another example, transmitter 114 may transmit the Band Steering Command ANQP message to multiband AP 130, e.g., to indicate to multiband AP 130 that multiband mobile device 110 is to steer communications from one band to another.

In some demonstrative embodiments, the Band Steering Command ANQP message may include source band information relating to a band communication is to be steered form ("source band"), if applicable, and target band information relating to a band to which communication is to be steered ("target band").

Figure 6A:
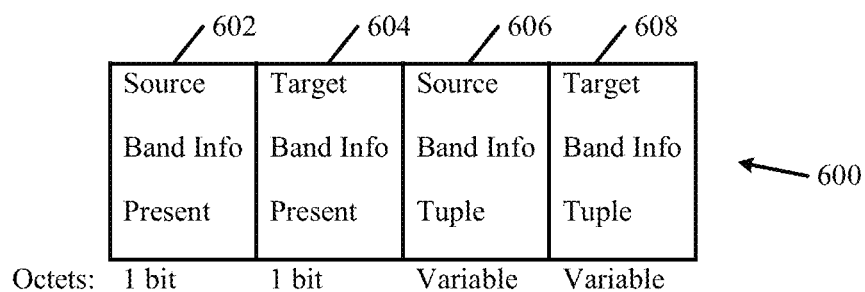
FIG. 6A is a schematic illustration of a band steering ANQP message, in accordance with some demonstrative embodiments.

Reference is made to FIG. 6A, which schematically illustrates a Band Steering Command ANQP message 600, in accordance with some demonstrative embodiments.

As shown in FIG. 6A, Band Steering Command ANQP message 600 may include a bit 602 to indicate whether Band Steering Command ANQP message 600 includes a source band information tuple 606, and a bit 604 to indicate whether Band Steering Command ANQP message 600 includes a target band information tuple 608. For example, some Band Steering Command ANQP messages 600 may not include Source band information tuple 606.

Figure 6B:
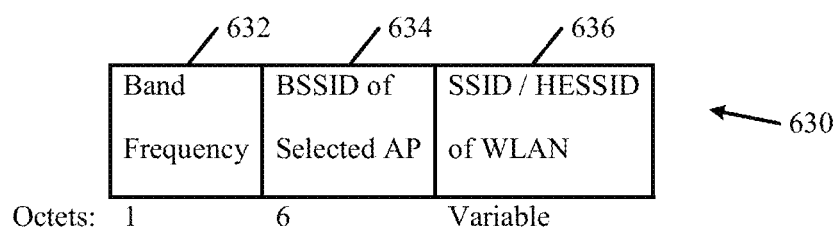
FIG. 6B is a schematic illustration of an information tuple, in accordance with some demonstrative embodiments.

Reference is also made to FIG. 6B, which schematically illustrates a band information tuple 630. For example, source band information tuple 606 may include band information tuple 630 and/or target band information tuple 608 may include band information tuple 630.

As shown in FIG. 6B, band information tuple 630 may include a band frequency 632. For example, band frequency 632 may include a source band frequency in Source band information tuple 606, and band frequency 632 may include a target band frequency in Target band information tuple 608. In one example, band frequency 632 may have a value assigned according to Table 2.

In some demonstrative embodiments, band information tuple 630 may include an identifier 634, e.g., a BSS identifier (BSSID), of an AP, e.g., multiband AP (130), with which a multiband mobile device, e.g., multiband mobile device 110 (FIG. 1), may be associated.

In some demonstrative embodiments, band information tuple 630 may include an identifier 636, e.g., a Service Set Identifier (SSID) or a Homogenous Extended Service Set Identifier (HESSID), of a WLAN network with which the multiband mobile device may be associated.

In some demonstrative embodiments, multiband AP 130 (FIG. 1) may transmit Band Steering Command ANQP message 600 to multiband mobile device 110 (FIG. 1), for example, to direct multiband mobile device 110 to move some or all traffic from a source band defined according to source band information tuple 606 to a target band defined according to target band information tuple 608. Multiband mobile device 110 (FIG. 1) may receive the transmit Band Steering Command ANQP message 600. Multiband mobile device 110 (FIG. 1) may disassociate with the SSID of the source band, as indicated by source band information tuple 606, and may associate with the SSID of the target band and re-establish connectivity, according to target band information tuple 608.

In some demonstrative embodiments, multiband mobile station 110 (FIG. 1) may transmit Band Steering Command ANQP message 600 to multiband AP 130 (FIG. 1), for example, to request to move from one band to another band. Multiband AP 130 (FIG. 1) may acknowledge or refuse the request.

Figure 7:
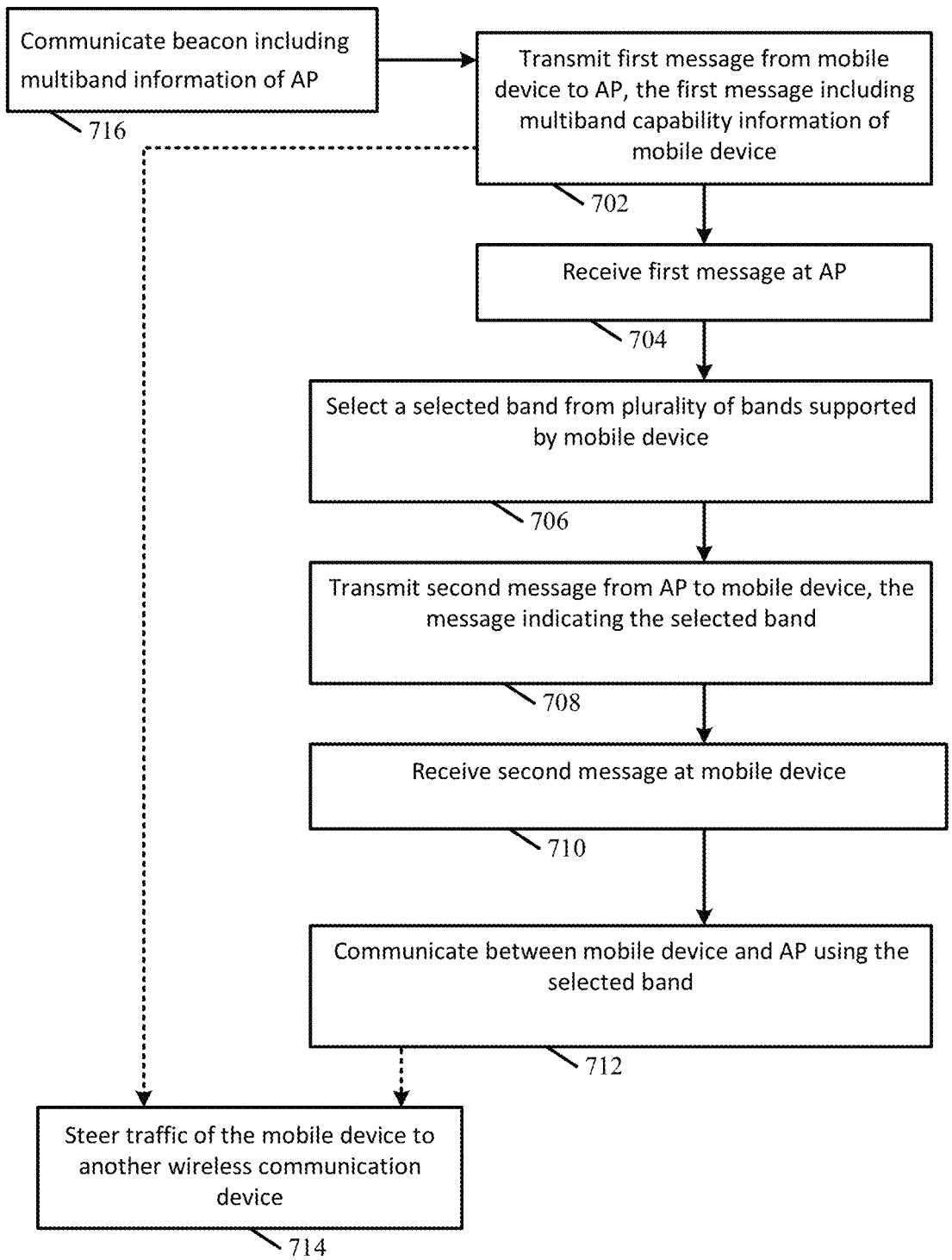
FIG. 7 is a schematic flow-chart illustration of a method of multiband wireless communication, in accordance with some demonstrative embodiments.

Reference is made to FIG. 7, which schematically illustrates a method of multiband wireless communication, in accordance with some demonstrative embodiments. For example, one or more operations of the method of FIG. 7 may be performed by a system, e.g., system 100 (FIG. 1), a multiband mobile device, e.g., multiband mobile device 110 (FIG. 1), a multiband AP, e.g., multiband AP 130 (FIG. 1) and/or multiband AP 150 (FIG. 1), a controller, e.g., controller 118 (FIG. 1) and/or controller 138 (FIG. 1), and/or a multiband radio, e.g., multiband radio 112 (FIG. 1) and/or multiband radio 132 (FIG. 1).

As indicated at block 702, the method may include transmitting from a mobile device a first message to AP, the first message including multiband capability information indicating a plurality of supported wireless communication bands of the mobile device. For example, transmitter 114 (FIG. 1) may transmit to multiband AP 130 (FIG. 1) a message, e.g., an ANQP message, including multiband capability information indicating a plurality of supported wireless communication bands of multiband mobile device 110 (FIG. 1), e.g., as described above.

As indicated at block 704, the method may include receiving the first message at the AP. For example, receiver 136 (FIG. 1) may receive the message, e.g., the ANQP message, including the multiband capability information from multiband mobile device 110 (FIG. 1), e.g., as described above.

As indicated at block 706, the method may include selecting a selected wireless communication band from the plurality of supported wireless communication bands. For example, controller 138 (FIG. 1) may select a band from the plurality of bands supported by multiband mobile device 110 (FIG. 1) to be used to communicate traffic between multiband mobile device 110 (FIG. 1) and multiband AP 130 (FIG. 1), e.g., as described above.

As indicated at block 708, the method may include transmitting a second message from the AP to the mobile device, the second message including an indication of the selected wireless communication band. For example, transmitter 134 (FIG. 1) may transmit the second message to multiband mobile device 110 (FIG. 1), e.g., as described above.

As indicated at block 710, the method may include receiving the second message at the mobile device. For example, receiver 116 (FIG. 1) may receive the second message from multiband AP 130 (FIG. 1) including an indication of the selected wireless communication band from the plurality of supported wireless communication bands of multiband mobile device 110 (FIG. 1).

As indicated at block 712, the method may include communicating between the AP and the mobile device over the selected wireless communication band. For example, controller 118 (FIG. 1) may control multiband mobile device 110 (FIG. 1) to communicate with multiband AP 130 (FIG. 1) over the selected wireless communication band, e.g., as described above.

As indicated at block 714, the method may include steering traffic of the mobile device to another wireless communication device. For example, multiband AP 130 (FIG. 1) may steer traffic of multiband mobile device 110 (FIG. 1) to another AP, e.g., multiband AP 150 (FIG. 1), or to another network, e.g., to cellular network 159 (FIG. 1), e.g., as described above.

In some demonstrative embodiments, steering the traffic of the mobile device may include steering the traffic before association with the mobile device, for example, in response to a request to associate from the mobile device, e.g., as described above.

In some demonstrative embodiments, steering the traffic of the mobile device may include steering the traffic after association with the mobile device, for example, based on a change in and or other band conditions, e.g., as described above.

As indicated at block 716, the method may include communicating a beacon including multiband capability information indicating a plurality of wireless communication bands supported by the AP. For example, multiband AP 130 (FIG. 1) may broadcast a beacon including the multiband capability information indicating a plurality of wireless communication bands supported by multiband AP 130 (FIG. 1), e.g., as described above.

Figure 8:
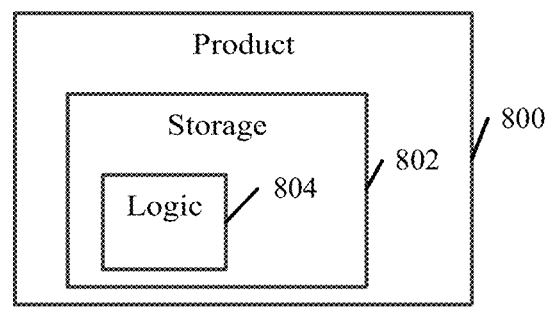
FIG. 8 is a schematic illustration of a product of manufacture, in accordance with some demonstrative embodiments.

Reference is made to FIG. 8, which schematically illustrates a product of manufacture 800, in accordance with some demonstrative embodiments. Product 800 may include one or more non-transitory machine-readable storage mediums 802 to store logic 804, which may be used, for example, to perform at least part of the functionality of one or more elements of a system, e.g., system 100 (FIG. 1), one or more elements of a multiband mobile device, e.g., multiband mobile device 110 (FIG. 1), one or more elements of a multiband AP, e.g., multiband AP 130 (FIG. 1) and/or multiband AP 150 (FIG. 1), a controller, e.g., controller 118 (FIG. 1) and/or controller 138 (FIG. 1), and/or a multiband radio, e.g., multiband radio 112 (FIG. 1) and/or multiband radio 132 (FIG. 1), and/or to perform one or more operations of the method of FIG. 7. The phrase "non-transitory machine-readable medium" is directed to include all computer-readable media, with the sole exception being a transitory propagating signal.

In some demonstrative embodiments, product 800 and/or machine-readable storage medium 802 may include one or more types of computer-readable storage media capable of storing data, including volatile memory, non-volatile memory, removable or non-removable memory, erasable or non-erasable memory, writeable or re-writeable memory, and the like. For example, machine-readable storage medium 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 804 may include instructions, data, and/or code, which, if executed by one or more computing machines, may cause the one or more computing machines to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 804 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a multiband wireless communication device comprising a receiver to receive a first message from a mobile device, the first message including multiband capability information indicating a plurality of supported wireless communication bands of the mobile device; a controller to select a selected wireless communication band from the plurality of supported wireless communication bands; and a transmitter to transmit a second message to the mobile device, the second message including an indication of the selected wireless communication band.

Example 2 includes the subject matter of Example 1, and optionally, wherein the first message comprises a pre-association query message prior to association with the mobile device, the second message being in response to the pre-association query message.

Example 3 includes the subject matter of Example 1, and optionally, wherein the second message comprises a steering message to steer traffic of the mobile device from another wireless communication band to the selected wireless communication band.

Example 4 includes the subject matter of Example 1, and optionally, wherein the controller is to select an offloading device when a load of each of the plurality of supported wireless communication bands is above a predefined overload threshold, the second message including an offloading message to request the mobile device to associate with the offloading device over the selected wireless communication band.

Example 5 includes the subject matter of Example 4, and optionally, wherein the receiver is to receive from the offloading device load information, and to select the selected wireless communication band based on the load information.

Example 6 includes the subject matter of any one of Examples 1-5, and optionally, wherein the transmitter is to transmit a beacon including multiband capability information indicating a plurality of wireless communication bands supported by the multiband wireless communication device.

Example 7 includes the subject matter of any one of Examples 1-6, and optionally, wherein the controller is to select to steer the mobile device to another wireless communication device based on one or more network management parameters, and wherein the transmitter is to transmit to the mobile device a steering message to steer the mobile device to the another wireless communication device.

Example 8 includes the subject matter of Example 7, and optionally, wherein the receiver is to receive a request to associate from the mobile device, and wherein the controller is to select to steer the mobile device to the another wireless communication device if the request is to be rejected by the multiband wireless communication device.

Example 9 includes the subject matter of Example 7 or 8, and optionally, wherein the another wireless communication device comprises a cellular node.

Example 10 includes the subject matter of any one of Examples 1-9, and optionally, wherein the second message comprises a neighbor Access-Point (AP) Information Element (IE) including the indication of the selected wireless communication band.

Example 11 includes the subject matter of any one of Examples 1-10, and optionally, wherein the controller is to select the selected wireless communication band based on at least one attribute selected form the group consisting of a load of the selected wireless communication band, and an interference level the selected wireless communication band.

Example 12 includes the subject matter of any one of Examples 1-11, and optionally, wherein the first and second messages comprise Access Network Query Protocol (ANQP) messages.

Example 13 includes the subject matter of any one of Examples 1-12, and optionally, wherein the plurality of supported wireless communication bands comprises a plurality of Wireless-Local-Area-Network (WLAN) bands.

Example 14 includes a multiband Access Point (AP) comprising one or more antennas; a memory; a processor; a receiver to receive a first message from a mobile device, the first message including multiband capability information indicating a plurality of supported wireless communication bands; a controller to select a selected wireless communication band from the plurality of supported wireless communication bands; and a transmitter to transmit a second message to the mobile device, the second message including an indication of the selected wireless communication band.

Example 15 includes the subject matter of Example 14, and optionally, wherein the first message comprises a pre-association query message prior to association with the mobile device, the second message being in response to the pre-association query message.

Example 16 includes the subject matter of Example 14, and optionally, wherein the second message comprises a steering message to steer traffic of the mobile device from another wireless communication band to the selected wireless communication band.

Example 17 includes the subject matter of Example 14, and optionally, wherein the controller is to select an offloading device when a load of each of the plurality of supported wireless communication bands is above a predefined overload threshold, the second message including an offloading message to request the mobile device to associate with the offloading device over the selected wireless communication band.

Example 18 includes the subject matter of Example 17, and optionally, wherein the receiver is to receive from the offloading device load information, and to select the selected wireless communication band based on the load information.

Example 19 includes the subject matter of any one of Examples 14-18, and optionally, wherein the transmitter is to transmit a beacon including multiband capability information indicating a plurality of wireless communication bands supported by the multiband AP.

Example 20 includes the subject matter of any one of Examples 14-19, and optionally, wherein the controller is to select to steer the mobile device to another wireless communication device based on one or more network management parameters, and wherein the transmitter is to transmit to the mobile device a steering message to steer the mobile device to the another wireless communication device.

Example 21 includes the subject matter of Example 20, and optionally, wherein the receiver is to receive a request to associate from the mobile device, and wherein the controller is to select to steer the mobile device to the another wireless communication device if the request is to be rejected by the multiband AP.

Example 22 includes the subject matter of Example 20 or 21, and optionally, wherein the another wireless communication device comprises a cellular node.

Example 23 includes the subject matter of any one of Examples 14-22, and optionally, wherein the second message comprises a neighbor Access-Point (AP) Information Element (IE) including the indication of the selected wireless communication band.

Example 24 includes the subject matter of any one of Examples 14-23, and optionally, wherein the controller is to select the selected wireless communication band based on at least one attribute selected form the group consisting of a load of the selected wireless communication band, and an interference level the selected wireless communication band.

Example 25 includes the subject matter of any one of Examples 14-24, and optionally, wherein the first and second messages comprise Access Network Query Protocol (ANQP) messages.

Example 26 includes the subject matter of any one of Examples 14-25, and optionally, wherein the plurality of supported wireless communication bands comprises a plurality of Wireless-Local-Area-Network (WLAN) bands.

Example 27 includes a method performed at a multiband Access Point (AP), the method comprising receiving a first message from a mobile device, the first message including multiband capability information indicating a plurality of supported wireless communication bands; selecting a selected wireless communication band from the plurality of supported wireless communication bands; and transmitting a second message to the mobile device, the second message including an indication of the selected wireless communication band.

Example 28 includes the subject matter of Example 27, and optionally, wherein the first message comprises a pre-association query message prior to association with the mobile device, the second message being in response to the pre-association query message.

Example 29 includes the subject matter of Example 27, and optionally, wherein the second message comprises a steering message to steer traffic of the mobile device from another wireless communication band to the selected wireless communication band.

Example 30 includes the subject matter of Example 27, and optionally, comprising selecting an offloading device when a load of each of the plurality of supported wireless communication bands is above a predefined overload threshold, the second message including an offloading message to request the mobile device to associate with the offloading device over the selected wireless communication band.

Example 31 includes the subject matter of Example 30, and optionally, comprising receiving from the offloading device load information, and selecting the selected wireless communication band based on the load information.

Example 32 includes the subject matter of any one of Examples 27-31, and optionally, comprising transmitting a beacon including multiband capability information indicating a plurality of wireless communication bands supported by the multiband AP.

Example 33 includes the subject matter of any one of Examples 27-32, and optionally, comprising selecting to steer the mobile device to another wireless communication device based on one or more network management parameters, and transmitting to the mobile device a steering message to steer the mobile device to the another wireless communication device.

Example 34 includes the subject matter of Example 33, and optionally, comprising receiving a request to associate from the mobile device, and selecting to steer the mobile device to the another wireless communication device if the request is to be rejected by the multiband AP.

Example 35 includes the subject matter of Example 33 or 34, and optionally, wherein the another wireless communication device comprises a cellular node.

Example 36 includes the subject matter of any one of Examples 27-35, and optionally, wherein the second message comprises a neighbor Access-Point (AP) Information Element (IE) including the indication of the selected wireless communication band.

Example 37 includes the subject matter of any one of Examples 27-36, and optionally, comprising selecting the selected wireless communication band based on at least one attribute selected form the group consisting of a load of the selected wireless communication band, and an interference level the selected wireless communication band.

Example 38 includes the subject matter of any one of Examples 27-37, and optionally, wherein the first and second messages comprise Access Network Query Protocol (ANQP) messages.

Example 39 includes the subject matter of any one of Examples 27-38, and optionally, wherein the plurality of supported wireless communication bands comprises a plurality of Wireless-Local-Area-Network (WLAN) bands.

Example 40 includes a product comprising one or more tangible computer-readable non-transitory storage media comprising computer-executable instructions operable to, when executed by at least one computer processor, enable the at least one computer processor to implement a method comprising receiving at a multiband Access point (AP) a first message from a mobile device, the first message including multiband capability information indicating a plurality of supported wireless communication bands; selecting a selected wireless communication band from the plurality of supported wireless communication bands; and transmitting a second message from the multiband AP to the mobile device, the second message including an indication of the selected wireless communication band.

Example 41 includes the subject matter of Example 40, and optionally, wherein the first message comprises a pre-association query message prior to association with the mobile device, the second message being in response to the pre-association query message.

Example 42 includes the subject matter of Example 40, and optionally, wherein the second message comprises a steering message to steer traffic of the mobile device from another wireless communication band to the selected wireless communication band.

Example 43 includes the subject matter of Example 40, and optionally, wherein the method comprises selecting an offloading device when a load of each of the plurality of supported wireless communication bands is above a predefined overload threshold, the second message including an offloading message to request the mobile device to associate with the offloading device over the selected wireless communication band.

Example 44 includes the subject matter of Example 43, and optionally, wherein the method comprises receiving from the offloading device load information, and selecting the selected wireless communication band based on the load information.

Example 45 includes the subject matter of any one of Examples 40-44, and optionally, wherein the method comprises transmitting a beacon including multiband capability information indicating a plurality of wireless communication bands supported by the multiband AP.

Example 46 includes the subject matter of any one of Examples 40-45, and optionally, wherein the method comprises selecting to steer the mobile device to another wireless communication device based on one or more network management parameters, and transmitting to the mobile device a steering message to steer the mobile device to the another wireless communication device.

Example 47 includes the subject matter of Example 46, and optionally, wherein the method comprises receiving a request to associate from the mobile device, and selecting to steer the mobile device to the another wireless communication device if the request is to be rejected by the multiband AP.

Example 48 includes the subject matter of Example 46 or 47, and optionally, wherein the another wireless communication device comprises a cellular node.

Example 49 includes the subject matter of any one of Examples 40-48, and optionally, wherein the second message comprises a neighbor Access-Point (AP) Information Element (IE) including the indication of the selected wireless communication band.

Example 50 includes the subject matter of any one of Examples 40-49, and optionally, wherein the method comprises selecting the selected wireless communication band based on at least one attribute selected form the group consisting of a load of the selected wireless communication band, and an interference level the selected wireless communication band.

Example 51 includes the subject matter of any one of Examples 40-50, and optionally, wherein the first and second messages comprise Access Network Query Protocol (ANQP) messages.

Example 52 includes the subject matter of any one of Examples 40-51, and optionally, wherein the plurality of supported wireless communication bands comprises a plurality of Wireless-Local-Area-Network (WLAN) bands.

Example 53 includes a multiband mobile device comprising a transmitter to transmit a first message to an Access Point (AP), the first message including multiband capability information indicating a plurality of supported wireless communication bands of the mobile device; a receiver to receive a second message from the AP, the second message including an indication of a selected wireless communication band from the plurality of supported wireless communication bands; and a controller to control the transmitter and receiver to communicate with the AP over the selected wireless communication band.

Example 54 includes the subject matter of Example 53, and optionally, wherein the first message comprises a pre-association query message prior to association with the AP, the second message being in response to the pre-association query message.

Example 55 includes the subject matter of Example 53, and optionally, wherein the second message comprises a steering message, the controller is to steer traffic of the mobile device from another wireless communication band to the selected wireless communication band.

Example 56 includes the subject matter of Example 53, and optionally, wherein the second message comprises an offloading message indicating an offloading device, the controller is to associate with the offloading device over the selected wireless communication band.

Example 57 includes the subject matter of any one of Examples 53-56, and optionally, wherein the receiver is to receive a beacon from the AP, the beacon including multiband capability information indicating a plurality of wireless communication band supported by the AP.

Example 58 includes the subject matter of any one of Examples 53-57, and optionally, wherein the receiver is to receive from the AP a steering message indicating a wireless communication device, the controller is to steer the mobile device to the wireless communication device.

Example 59 includes the subject matter of Example 58, and optionally, wherein the transmitter is to transmit to the AP a request to associate, and the receiver is to receive the steering message in response to the request to associate.

Example 60 includes the subject matter of Example 58 or 59, and optionally, wherein the wireless communication device comprises a cellular node.

Example 61 includes the subject matter of any one of Examples 53-60, and optionally, wherein the second message comprises a neighbor Access-Point (AP) Information Element (IE) including the indication of the selected wireless communication band.

Example 62 includes the subject matter of any one of Examples 53-61, and optionally, wherein the first and second messages comprise Access Network Query Protocol (ANQP) messages.

Example 63 includes the subject matter of any one of Examples 53-62, and optionally, comprising one or more antennas; a memory; and a processor.

Example 64 includes a method performed at a multiband mobile device, the method comprising transmitting a first message to an Access Point (AP), the first message including multiband capability information indicating a plurality of supported wireless communication bands of the mobile device; receiving a second message from the AP, the second message including an indication of a selected wireless communication band from the plurality of supported wireless communication bands; and communicating with the AP over the selected wireless communication band.

Example 65 includes the subject matter of Example 64, and optionally, wherein the first message comprises a pre-association query message prior to association with the AP, the second message being in response to the pre-association query message.

Example 66 includes the subject matter of Example 64, and optionally, wherein the second message comprises a steering message, the method comprising steering traffic of the mobile device from another wireless communication band to the selected wireless communication band.

Example 67 includes the subject matter of Example 64, and optionally, wherein the second message comprises an offloading message indicating an offloading device, the method comprising associating with the offloading device over the selected wireless communication band.

Example 68 includes the subject matter of any one of Examples 64-67, and optionally, comprising receiving a beacon from the AP, the beacon including multiband capability information indicating a plurality of wireless communication band supported by the AP.

Example 69 includes the subject matter of any one of Examples 64-68, and optionally, comprising receiving from the AP a steering message indicating a wireless communication device, and steering the mobile device to the wireless communication device.

Example 70 includes the subject matter of Example 69, and optionally, comprising transmitting to the AP a request to associate, and receiving the steering message in response to the request to associate.

Example 71 includes the subject matter of Example 69 or 70, and optionally, wherein the wireless communication device comprises a cellular node.

Example 72 includes the subject matter of any one of Examples 64-71, and optionally, wherein the second message comprises a neighbor Access-Point (AP) Information Element (IE) including the indication of the selected wireless communication band.

Example 73 includes the subject matter of any one of Examples 64-72, and optionally, wherein the first and second messages comprise Access Network Query Protocol (ANQP) messages.

Example 74 includes a product including one or more tangible computer-readable non-transitory storage media comprising computer-executable instructions operable to, when executed by at least one computer processor, enable the at least one computer processor to implement a method comprising transmitting from a mobile device a first message to an Access Point (AP), the first message including multiband capability information indicating a plurality of supported wireless communication bands of the mobile device; receiving at the mobile device a second message from the AP, the second message including an indication of a selected wireless communication band from the plurality of supported wireless communication bands; and communicating with the AP over the selected wireless communication band.

Example 75 includes the subject matter of Example 74, and optionally, wherein the first message comprises a pre-association query message prior to association with the AP, the second message being in response to the pre-association query message.

Example 76 includes the subject matter of Example 74, and optionally, wherein the second message comprises a steering message, the method comprising steering traffic of the mobile device from another wireless communication band to the selected wireless communication band.

Example 77 includes the subject matter of Example 74, and optionally, wherein the second message comprises an offloading message indicating an offloading device, the method comprising associating with the offloading device over the selected wireless communication band.

Example 78 includes the subject matter of any one of Examples 74-77, and optionally, wherein the method comprises receiving a beacon from the AP, the beacon including multiband capability information indicating a plurality of wireless communication band supported by the AP.

Example 79 includes the subject matter of any one of Examples 74-78, and optionally, wherein the method comprises receiving from the AP a steering message indicating a wireless communication device, and steering the mobile device to the wireless communication device.

Example 80 includes the subject matter of Example 79, and optionally, wherein the method comprises transmitting to the AP a request to associate, and receiving the steering message in response to the request to associate.

Example 81 includes the subject matter of Example 79 or 80, and optionally, wherein the wireless communication device comprises a cellular node.

Example 82 includes the subject matter of any one of Examples 74-81, and optionally, wherein the second message comprises a neighbor Access-Point (AP) Information Element (IE) including the indication of the selected wireless communication band.

Example 83 includes the subject matter of any one of Examples 74-82, and optionally, wherein the first and second messages comprise Access Network Query Protocol (ANQP) messages.

Example 84 includes an apparatus comprising means for receiving a first message from a mobile device, the first message including multiband capability information indicating a plurality of supported wireless communication bands; means for selecting a selected wireless communication band from the plurality of supported wireless communication bands; and means for transmitting a second message to the mobile device, the second message including an indication of the selected wireless communication band.

Example 85 includes the subject matter of Example 84, and optionally, wherein the first message comprises a pre-association query message prior to association with the mobile device, the second message being in response to the pre-association query message.

Example 86 includes the subject matter of Example 84, and optionally, wherein the second message comprises a steering message to steer traffic of the mobile device from another wireless communication band to the selected wireless communication band.

Example 87 includes the subject matter of Example 84, and optionally, comprising means for selecting an offloading device when a load of each of the plurality of supported wireless communication bands is above a predefined overload threshold, the second message including an offloading message to request the mobile device to associate with the offloading device over the selected wireless communication band.

Example 88 includes the subject matter of Example 87, and optionally, comprising means for receiving from the offloading device load information, and selecting the selected wireless communication band based on the load information.

Example 89 includes the subject matter of any one of Examples 84-88, and optionally, comprising means for transmitting a beacon including multiband capability information indicating a plurality of wireless communication bands.

Example 90 includes the subject matter of any one of Examples 88-89, and optionally, comprising means for selecting to steer the mobile device to another wireless communication device based on one or more network management parameters, and means for transmitting to the mobile device a steering message to steer the mobile device to the another wireless communication device.

Example 91 includes the subject matter of Example 90, and optionally, comprising means for receiving a request to associate from the mobile device, and means for selecting to steer the mobile device to the another wireless communication device if the request is to be rejected.

Example 92 includes the subject matter of Example 90 or 91, and optionally, wherein the another wireless communication device comprises a cellular node.

Example 93 includes the subject matter of any one of Examples 84-92, and optionally, wherein the second message comprises a neighbor Access-Point (AP) Information Element (IE) including the indication of the selected wireless communication band.

Example 94 includes the subject matter of any one of Examples 84-93, and optionally, comprising means for selecting the selected wireless communication band based on at least one attribute selected form the group consisting of a load of the selected wireless communication band, and an interference level the selected wireless communication band.

Example 95 includes the subject matter of any one of Examples 84-94, and optionally, wherein the first and second messages comprise Access Network Query Protocol (ANQP) messages.

Example 96 includes the subject matter of any one of Examples 84-95, and optionally, wherein the plurality of supported wireless communication bands comprises a plurality of Wireless-Local-Area-Network (WLAN) bands.

Example 97 includes an apparatus comprising means for transmitting from a mobile device a first message to an Access Point (AP), the first message including multiband capability information indicating a plurality of supported wireless communication bands of the mobile device; means for receiving at the mobile device a second message from the AP, the second message including an indication of a selected wireless communication band from the plurality of supported wireless communication bands; and means for communicating with the AP over the selected wireless communication band.

Example 98 includes the subject matter of Example 97, and optionally, wherein the first message comprises a pre-association query message prior to association with the AP, the second message being in response to the pre-association query message.

Example 99 includes the subject matter of Example 97, and optionally, wherein the second message comprises a steering message, the apparatus comprising means for steering traffic of the mobile device from another wireless communication band to the selected wireless communication band.

Example 100 includes the subject matter of Example 97, and optionally, wherein the second message comprises an offloading message indicating an offloading device, the apparatus comprising means for associating with the offloading device over the selected wireless communication band.

Example 101 includes the subject matter of any one of Examples 97-100, and optionally, comprising means for receiving a beacon from the AP, the beacon including multiband capability information indicating a plurality of wireless communication band supported by the AP.

Example 102 includes the subject matter of any one of Examples 97-101, and optionally, comprising means for receiving from the AP a steering message indicating a wireless communication device, and steering the mobile device to the wireless communication device.

Example 103 includes the subject matter of Example 102, and optionally, comprising means for transmitting to the AP a request to associate, and receiving the steering message in response to the request to associate.

Example 104 includes the subject matter of Example 102 or 103, and optionally, wherein the wireless communication device comprises a cellular node.

Example 105 includes the subject matter of any one of Examples 97-104, and optionally, wherein the second message comprises a neighbor Access-Point (AP) Information Element (IE) including the indication of the selected wireless communication band.

Example 106 includes the subject matter of any one of Examples 97-105, and optionally, wherein the first and second messages comprise Access Network Query Protocol (ANQP) messages.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
a memory to store logic; and
a processor configured to execute the logic to cause a multiband wireless communication station (STA) to:
process a beacon from a multiband Access point (AP), the beacon comprising multiband capability information corresponding to the multiband AP to indicate one or more multiband capabilities of the multiband AP;
transmit a first message to the multiband AP, the first message comprising multiband capability information corresponding to the multiband STA, the multiband capability information corresponding to the multiband STA to indicate that the multiband STA is a multiband multi-mode STA having both WiFi connectivity and cellular connectivity; and subsequent to transmission of the first message to the multiband AP, receive from the multiband AP a second message to indicate to the multiband STA to steer traffic to a cellular node of a cellular network.

2. The apparatus of claim 1 configured to cause the multiband STA to steer to a Basic Service Set (BSS) based on a BSS transition request from the multiband AP.

3. The apparatus of claim 2, wherein the BSS transition request is based on a load-balancing criterion.

4. The apparatus of claim 2, wherein the BSS transition request is based on an interference criterion.

5. The apparatus of claim 2, wherein the BSS transition request is based on a capacity criterion.

6. The apparatus of claim 1 configured to cause the multiband STA to associate with a Basic Service Set (BSS) based on a BSS identifier received from the multiband AP.

7. The apparatus of claim 1, wherein the multiband capability information corresponding to the multiband STA comprises an indication of a plurality of supported wireless communication bands of said multiband STA.

8. The apparatus of claim 1, wherein the first message comprises an association request.

9. The apparatus of claim 1 configured to cause the multiband STA to communicate the first and second messages with the multiband AP over a 2.4 Gigahertz (GHz) band or a 5 GHz band.

10. The apparatus of claim 1 comprising a multiband radio to receive the beacon, transmit the first message, and receive the second message.

11. The apparatus of claim 10 comprising one or more antennas connected to the multiband radio, a another memory to store data processed by the multiband STA, and a another processor to execute instructions of an operating system of the multiband STA.

12. A product comprising one or more tangible computer-readable non-transitory storage media comprising computer-executable instructions operable to, when executed by at least one processor, enable the at least one processor to cause a multiband wireless communication station (STA) to:
 process a beacon from a multiband Access point (AP), the beacon comprising multiband capability information corresponding to the multiband AP to indicate one or more multiband capabilities of the multiband AP;
 transmit a first message to the multiband AP, the first message comprising multiband capability information corresponding to the multiband STA, the multiband capability information corresponding to the multiband STA to indicate that the multiband STA is a multiband multi-mode STA having both WiFi connectivity and cellular connectivity; and subsequent to transmission of the first message to the multiband AP, receive from the multiband AP a second message to indicate to the multiband STA to steer traffic to a cellular node of a cellular network.

13. The product of claim 12, wherein the instructions, when executed, cause the multiband STA to steer to a Basic Service Set (BSS) based on a BSS transition request from the multiband AP.

14. The product of claim 13, wherein the BSS transition request is based on at least one of a load-balancing criterion, an interference criterion, or a capacity criterion.

15. The product of claim 12, wherein the instructions, when executed, cause the multiband STA to associate with a Basic Service Set (BSS) based on a BSS identifier received from the multiband AP.

16. The product of claim 12, wherein the multiband capability information corresponding to the multiband STA comprises an indication of a plurality of supported wireless communication bands of said multiband STA.

17. The product of claim 12, wherein the first message comprises an association request.

18. The product of claim 12, wherein the instructions, when executed, cause the multiband STA to communicate the first and second messages with the multiband AP over a 2.4 Gigahertz (GHz) band or a 5 GHz band.

19. An apparatus for a multiband wireless communication station (STA), the apparatus comprising:
 means for processing a beacon from a multiband Access point (AP), the beacon comprising multiband capability information corresponding to the multiband AP to indicate one or more multiband capabilities of the multiband AP;
 means for causing the multiband STA to transmit a first message to the multiband AP, the first message comprising multiband capability information corresponding to the multiband STA, the multiband capability information corresponding to the multiband STA to indicate that the multiband STA is a multiband multi-mode STA having both WiFi connectivity and cellular connectivity; and
 means for determining, based a second message from the multiband AP, that the multiband STA is to steer traffic to a cellular node of a cellular network, wherein reception of the second message from the multiband AP is subsequent to transmission of the first message to the multiband AP.

20. The apparatus of claim 19 comprising means for causing the multiband STA to steer to a Basic Service Set (BSS) based on a BSS transition request from the multiband AP.

* * * * *